United States Patent [19]

Gilanyi et al.

[11] Patent Number: 4,716,525
[45] Date of Patent: Dec. 29, 1987

[54] PERIPHERAL CONTROLLER FOR COUPLING DATA BUSES HAVING DIFFERENT PROTOCOL AND TRANSFER RATES

[75] Inventors: Robert A. Gilanyi, Long Branch; Ralph H. Schmitt, Manalapan, both of N.J.

[73] Assignee: Concurrent Computer Corporation, Holmdel, N.J.

[21] Appl. No.: 723,246

[22] Filed: Apr. 15, 1985

[51] Int. Cl.$^4$ .............................................. G06F 13/12
[52] U.S. Cl. .................................................... 364/200
[58] Field of Search ... 364/900 MS File, 200 MS File

[56] References Cited

U.S. PATENT DOCUMENTS

| | | | |
|---|---|---|---|
| 4,095,267 | 6/1978 | Morimoto | 364/200 |
| 4,369,494 | 1/1983 | Bienvenu et al. | 364/200 |
| 4,385,382 | 5/1983 | Goss et al. | 364/200 |

Primary Examiner—Archie E. Williams, Jr.
Assistant Examiner—Emily Y. Chan
Attorney, Agent, or Firm—Edwin T. Grimes; Frances L. Masselle; Thomas P. Murphy

[57] ABSTRACT

A peripheral controller is provided for controlling data transfers between peripheral devices operably on one type of data bus to devices operable on a second data bus. An intermediate buffer is utilized so that data is read into one memory block from the sending data bus and read out of another memory block to the receiving data bus. Controls are provided to prevent overwriting data which has not been transmitted and to prevent data transfers from the buffer until at least one block of memory has been filed.

3 Claims, 8 Drawing Figures

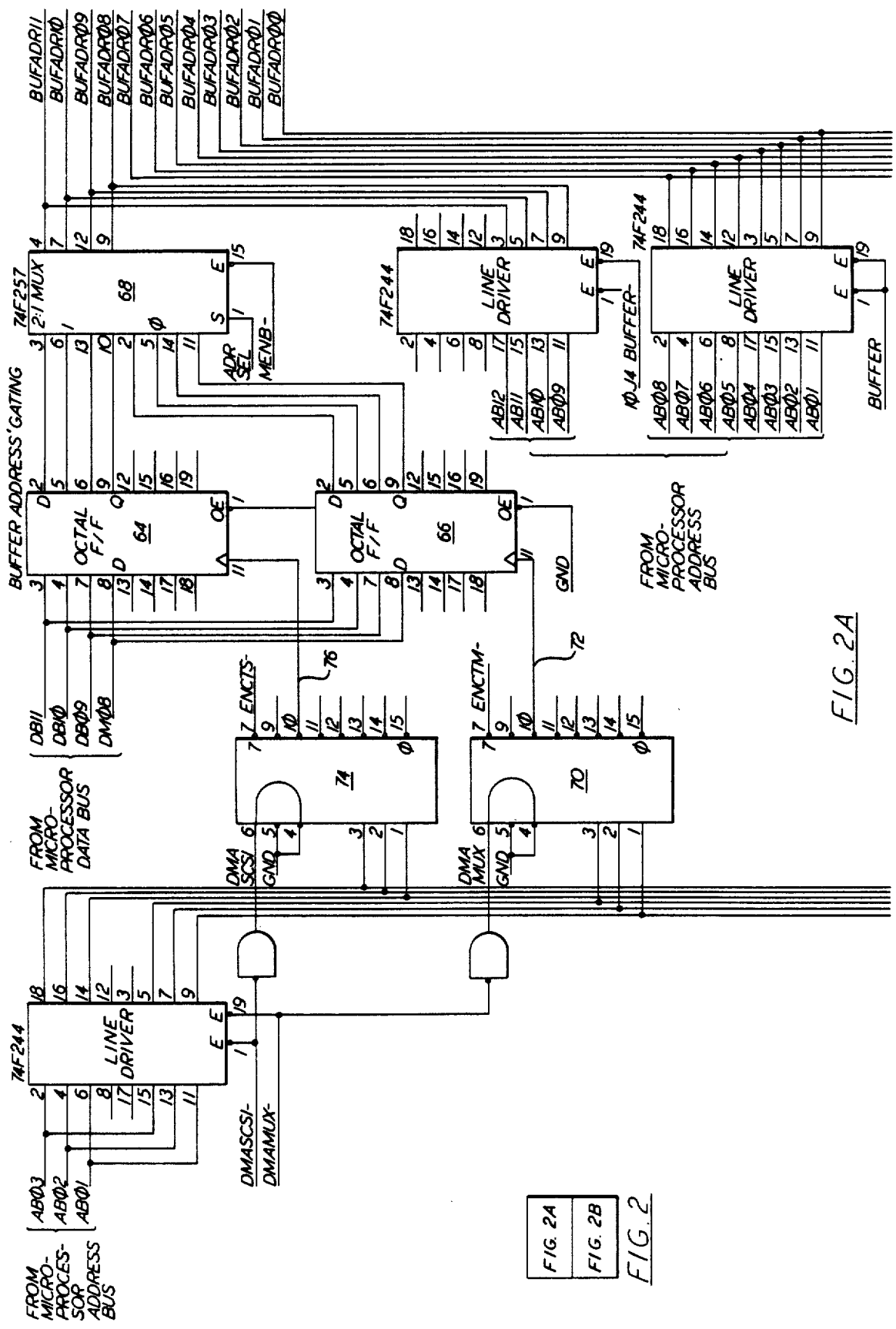

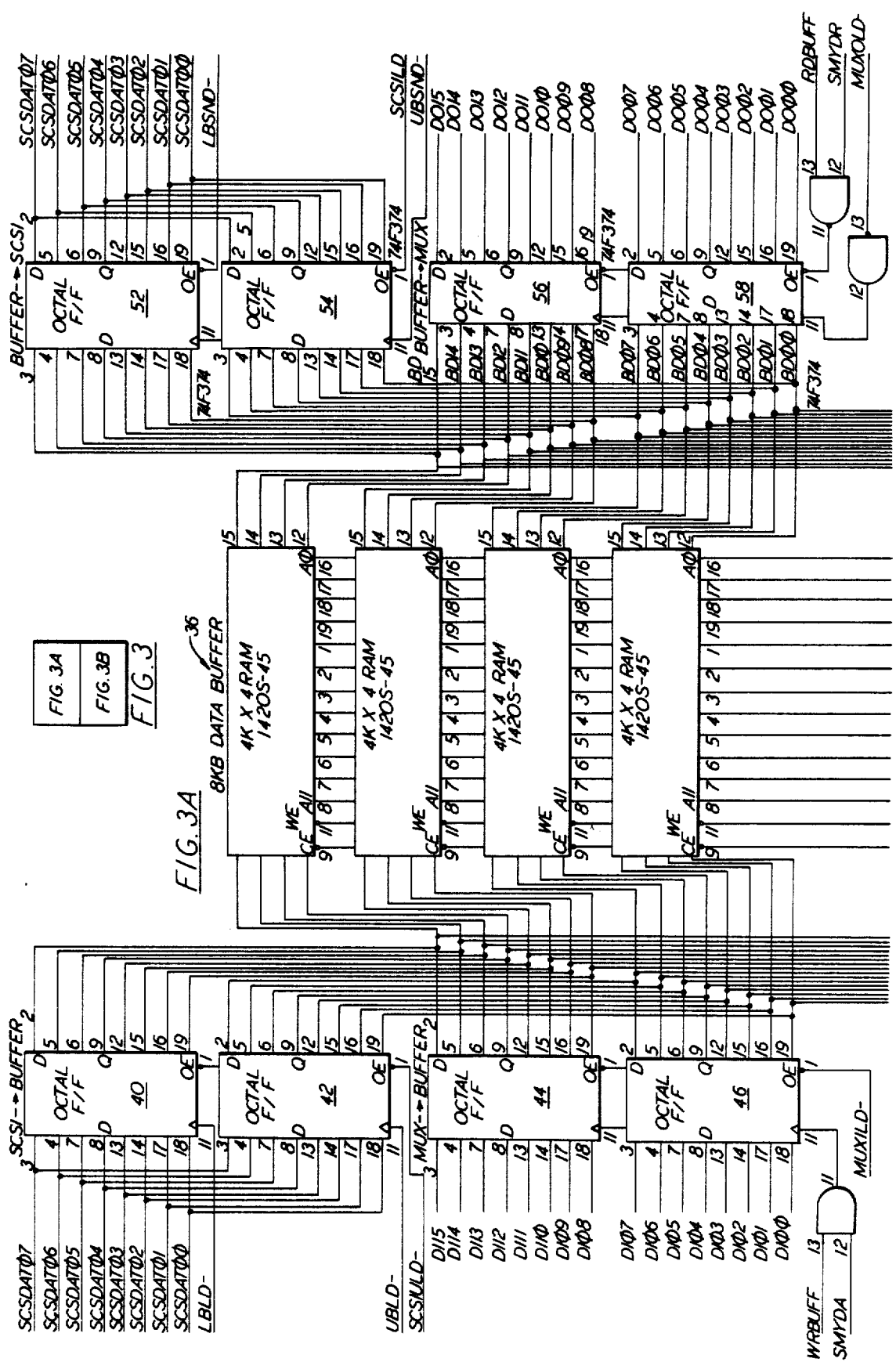

PERIPHERAL CONTROLLER FOR COUPLING DATA BUSES HAVING DIFFERENT PROTOCOL AND TRANSFER RATES

FIELD OF THE INVENTION

The present invention relates broadly to the field of digital computers and particularly to circuitry which allows peripheral devices that communicate over one type of data bus to be coupled to a computer system which internally has a different data bus.

BACKGROUND OF THE INVENTION

In the field of digital computers, typically each digital computer system has one or more data buses with particular bus protocols that are used to transmit data between functional elements within the system such as the arithmetic logic unit, the random access memories, the communication channels and the like. The above-mentioned computer system elements also are utilized in a typical configuration to communicate with magnetic tape transports, magnetic disk storage device, printers and communication networks with other computers. With respect to the later mentioned devices, it is not uncommon to have one or more communication channels which couple to controller devices to provide a way to convert the data signals interpretable directly by the device to data signals which can be interpreted by the channel to which the device is coupled.

In an effort to overcome some of the difficulties associated with coupling devices such as tape drives, printers, disk drives and networks to buses in computer systems, the industry has attempted to develop a standard interface known as the Small Computer System Interface (SCSI) which is an ANSII standard interface. At the time this application was in preparation, this interface was in the final stage of being adopted as a standard. The SCSI has been widely accepted in the industry and many products have already appeared which utilize this interface. With this occurring, it is apparent that computer manufacturers with proprietary internal buses will have to provide hardware which will convert signals on the SCSI bus to signals on their own proprietary buses to thereby permit such computers to be coupled to the large number of peripheral devices which are being developed to operate over the SCSI bus.

The SCSI bus itself is an intelligent bus in that the data transfer hand shaking between elements on opposite ends of the bus is relatively simple and that relatively complex command block information must be transmitted from the sending to the receiving end of the bus so that both ends will, for example, know how many data bytes of information are to be transmitted over the bus in a given data transfer operation. By doing so, the bus itself can be relatively simple but the control functions which must be performed by the hardware coupling to the bus on either end becomes considerably more complicated. In the situation where a controller is being developed to interface between devices on the SCSI bus and devices on another bus, the complexity is even greater. This is especially true in the event that the data transfer rate on one data bus is significantly different from the data transfer rate on the other of the buses. In situations of this sort, it becomes desirable to provide a buffering function within the controller. In the past, relatively simple buffers have been utilized which, for example, are first filled by the data bus initiating the transfer and then emptied by the bus receiving the transfer. In the event that the buffer is not sufficient to retain the whole data transfer, system efficiency is compromised because only one bus is operating at a particular moment in time.

Accordingly, it is a primary objective of the present invention to provide an apparatus useful in permitting transfer of data from one type of computer bus to another type of computer bus which may have a different data transfer rate.

It is a further objective of the present invention to provide a controller which permits transfer of data between two dissimilar data buses of differing data transfer rates and at the same time maximize the utilization of both buses during the data transfer.

SUMMARY OF THE INVENTION

In accomplishing these and other objectives of the present invention, the peripheral controller device hereinafter described in greater detail includes a data buffer which is accessible substantially simultaneously by both data buses coupled thereto. When a transfer of data is from the data bus having the higher data transfer rate to that having the slower data transfer rate, a portion of the data buffer is filled by the higher rate bus. Then, as additional portions of the buffer are filled, the lower rate bus begins and continues to remove data from the buffer substantially simultaneously with the higher rate bus filling other portions of the buffer. Accordingly, both data buses are operating substantially simultaneously until such time as, in certain events, the higher speed bus fills the buffer and must come to a halt until a portion is made available by reason of the fact that it has been transferred to the lower speed data bus and can subsequently be filled again by the higher speed bus. By making the buffer substantially large compared to typical data transfers, it is possible to minimize the number of times when the higher speed bus must go into a mode of waiting until buffer space is available.

When a data transfer occurs from the slower speed to the higher speed bus, a somewhat different mode for operating the buffer occurs. In this mode, the slower speed bus transfers data into the buffer. This data transfer continues until one segment of the buffer is filled by the lower speed bus. Then, the higher speed bus is actuated to remove data from the filled buffer segment and transmit it over that bus. The data will be transmitted over the high speed bus until the segment has been emptied. Then the higher speed bus waits for a new segment to be filled. In this mode, the slower speed bus is always operating and the higher speed bus intermittently operates at its maximum speed.

BRIEF DESCRIPTION OF THE DRAWINGS

The foregoing objects, advantages and features of the present invention are described below in connection with the drawings which form a part of the original disclosure wherein.

DESCRIPTION OF THE PREFERRED EMBODIMENT

Figure 1:
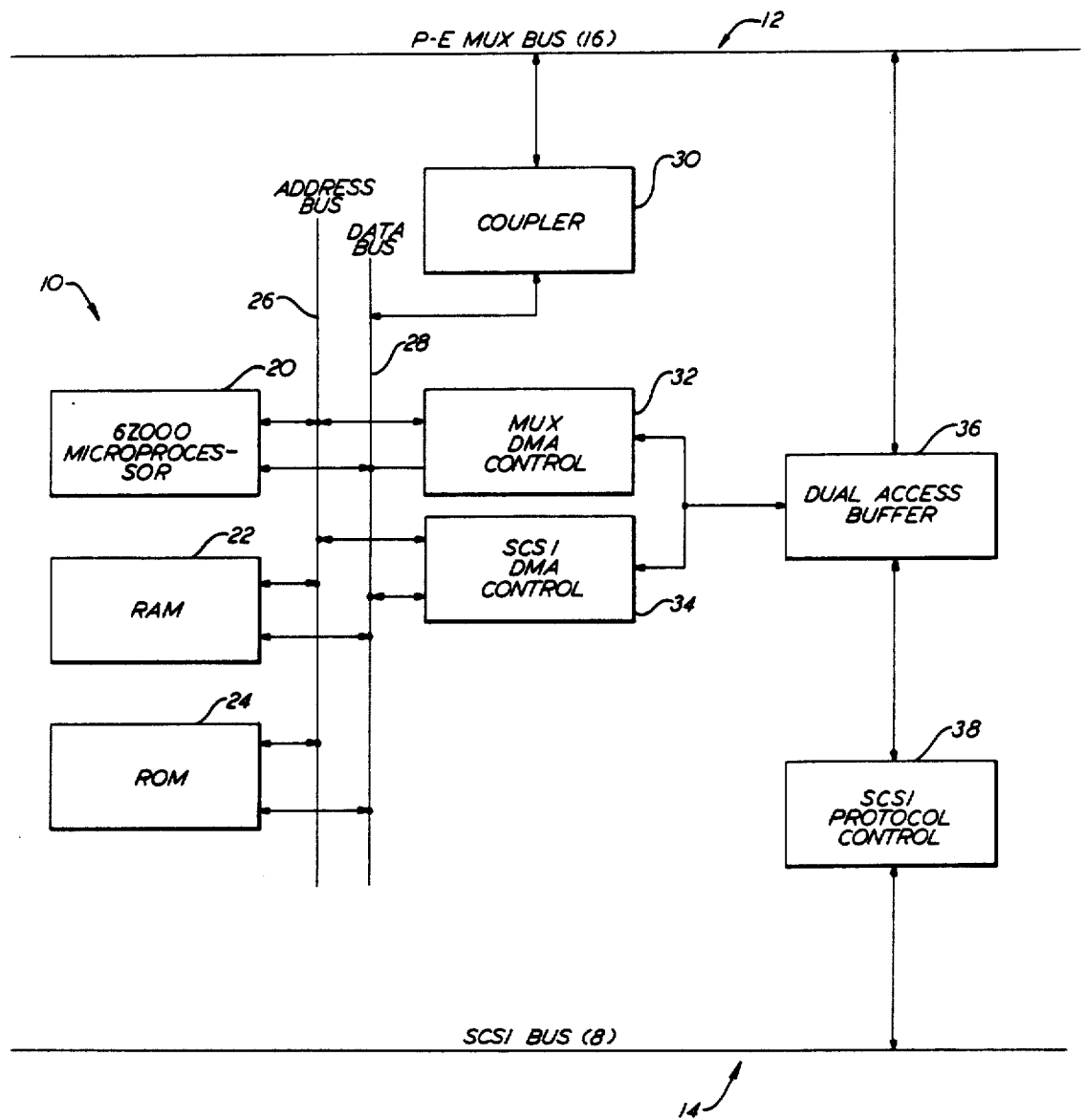
FIG. 1 is a block diagram for the peripheral controller of the present invention.

Referring first to FIG. 1, the circuitry of the present invention is illustrated generally at 10 and comprises that circuitry which couples between the P-E MUX bus 12 and the SCSI bus 14. The P-E MUX bus 12 comprises the MUX bus of a typical Perkin-Elmer computer such as a Perkin-Elmer Model 3210 or other computer in the Perkin-Elmer 3200 Series of computers. The SCSI bus 14 is the standard bus by that name which is described, for example, in the article entitled "SCSI Bus Solves Peripheral Interface Problems" which appeared in the magazine "Mini-Micro Systems" issue of May, 1984, pages 241-246. The circuitry of the present invention comprises a specific implementation for the element entitled "DMA host adapter" appearing in FIG. 3 of the Mini-Micro Systems article referred to.

The peripheral controller 10, in accordance with the present invention, includes a microprocessor 20, a random access memory (RAM) 22 and a read only (ROM) 24 all coupled together via an address bus 26 and a data bus 28. In the preferred embodiment, the microprocessor 20 is a "68000" microprocessor manufactured, for example, by Motorola or other supplier of this well known and accepted microprocessor. The RAM 22 is any suitable random access memory which can be utilized in the configuration illustrated for storing data to be used by the microprocessor 20. The ROM 24 is any suitable read only memory for storing the control program for operating the microprocessor 20 in the manner desired.

A coupler 30 is provided for buffering data as it is transmitted between the MUX bus 12 and the data bus 28. This data path is provided strictly for the purpose of passing information from the system coupled to the MUX bus 12 to the microprocessor 20. It is used, for example, to cause the microprocessor 20 to initialize the hardware so that a data transfer between the MUX bus 12 and the SCSI bus 14 is started.

The microprocessor 20, in initializing a data transfer between the MUX bus 12 and the SCSI bus 14 causes data to be placed into the MUX DMA controller circuit 32 and also into the SCSI DMA controller circuit 34 when such control data is required. The controller circuits 32 and 34 are operative in response to the data received from the microprocessor 20 to control the substantially simultaneously filling of one page in the dual access buffer 36 and removing data from another page in the buffer 36.

In controlling data transfer between the SCSI bus 14 and the buffer 36, an SCSI protocol control circuit 38 is utilized. This SCSI protocol circuit, in the preferred embodiment, comprises an NCR 5385 plus supporting circuitry typical of the type shown in engineering application notes for the NCR 5385. The purpose of this circuit, which is known in the prior art, is to provide the necessary control signals for operation on the SCSI bus 14 and to provide an interface which can easily utilized to couple, in the manner illustrated, to some other circuit such as buffer 36.

Figure 3B:
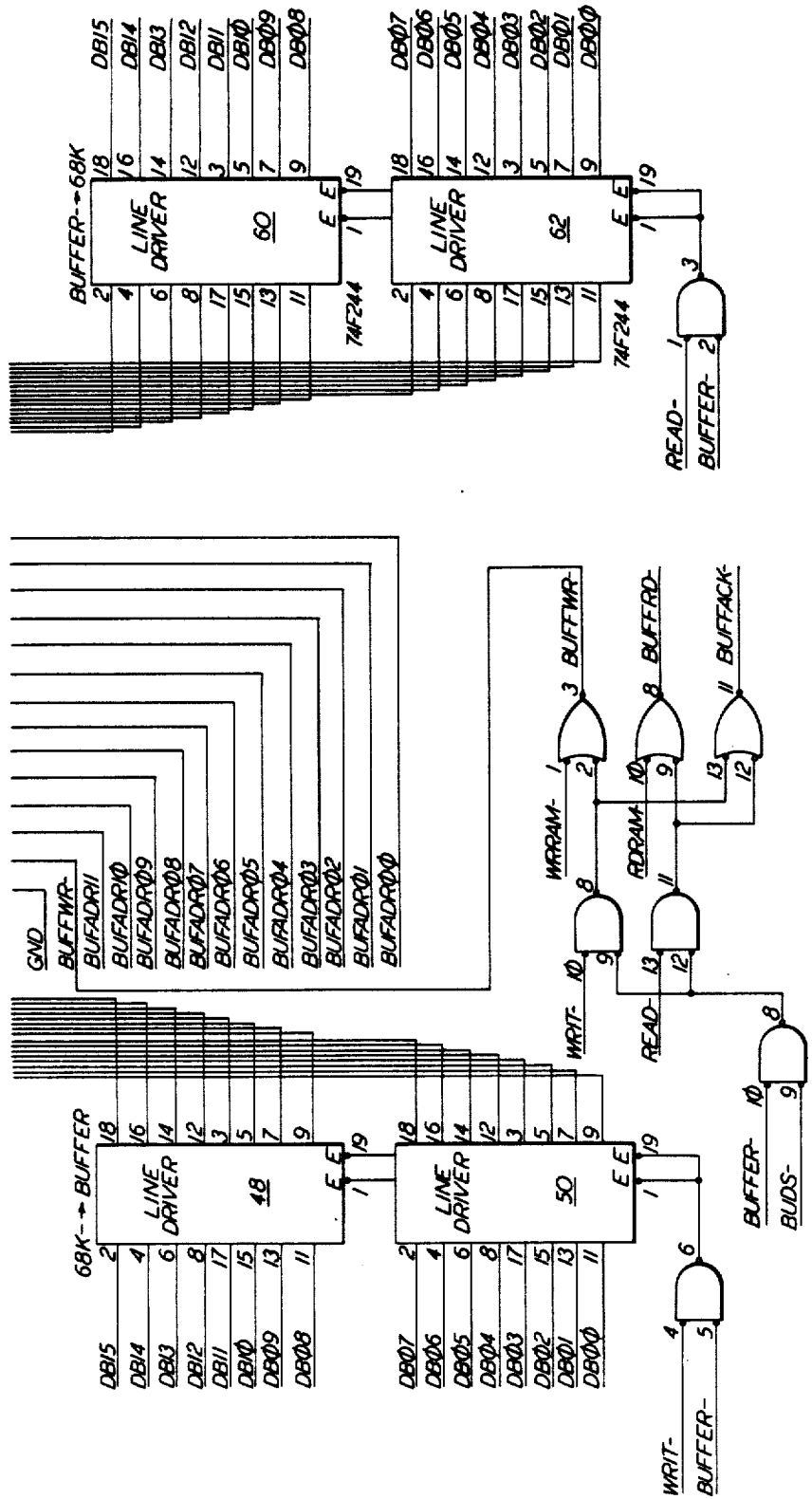

Referring now to FIG. 3, the dual access buffer 36 of the preferred embodiment is illustrated and comprises four 4K×4 RAM circuits such as 1420S-45 circuits. To the left of the buffer 36 is located a plurality of registers 40, 42, 44 and 46 and a pair of line buffers 48 and 50. In the preferred embodiment, the registers 40, 42, 44 and 46 comprise 74F374 circuits and these serve as staging buffers for the data coming from one of the data buses on their way to the buffer 36. Specifically, the register 40 is used in conjunction with the lower byte load signal (LBLD-) to load the lower data byte to be later stored in one location in the buffer 36. This data comes from the SCSI data bus over the lines labeled SCSDAT0-0-SCSDAT07. The register 42 operates in combination with the upper byte load signal (UBLD-) to store the upper data byte to be later stored in the same location in the buffer 36. Both of the registers 40 and 42 are gated by the SCSI bus unload signal (SCSIULD-). The other control signals which couple to the registers 40 and 42 are generated by the circuitry in FIG. 4 and these will be explained in greater detail later.

The registers 44 and 46 couple to the data bit positions of the MUX bus 12 as illustrated in FIG. 1. These inputs comprises the lines labeled DI00-DI15. The registers 44 and 45 are gated by the MUX input load signal (MUXILD-) and by the simultaneous occurrence of the write buffer (WRBUFF) and the synchronized data available signal (SMYDA) indicating that data is good on the MUX bus. When these three control signals are available, the data from the MUX data bus is gated into the registers 44 and 46 and the output thereof thereafter contains signals representative of the data from the MUX bus.

The line drivers 48 and 50 couple directly to the data buss 28 coupled to the microprocessor 20. These data bus 28 lines are labeled DB00-DB15. The line drivers 48 and 50 are actuated by the write signal (WRIT-) which comes directly from the microprocessor and the buffer select signal (BUFFER-) which is a signal decoded from the address bus 26 coupled to the microprocessor 20. The data path from the data bus coupled to the microprocessor to the buffer 36 is used primarily for diagnostic purposes thereby permitting selected locations of the buffer to be loaded with predetermined data words.

Figure 2B:
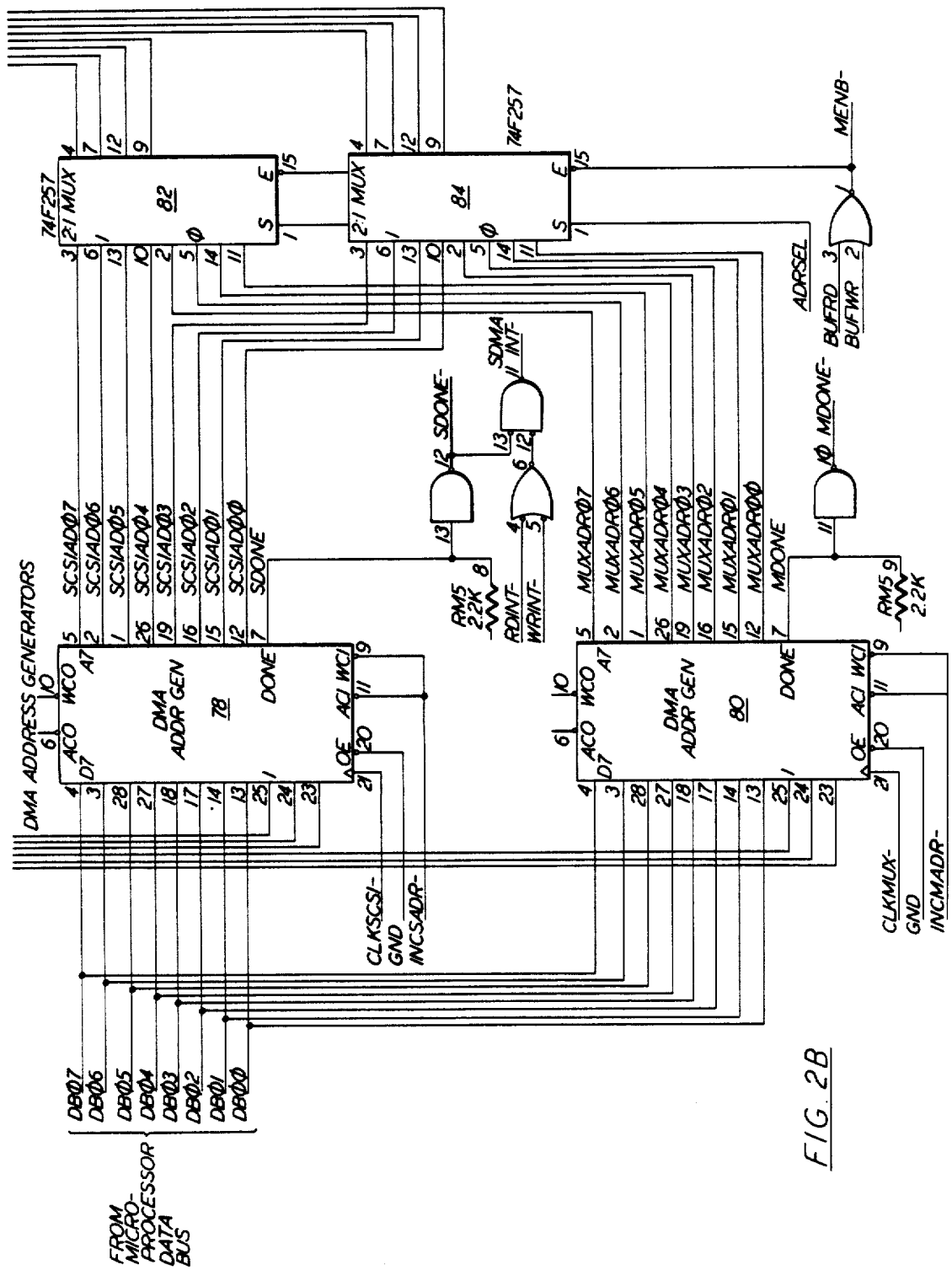
FIGS. 2–4 are detailed circuit diagrams for the MUX DMA control, the SCSI DMA control and the dual access buffer of FIG. 1.
Figure 4A:
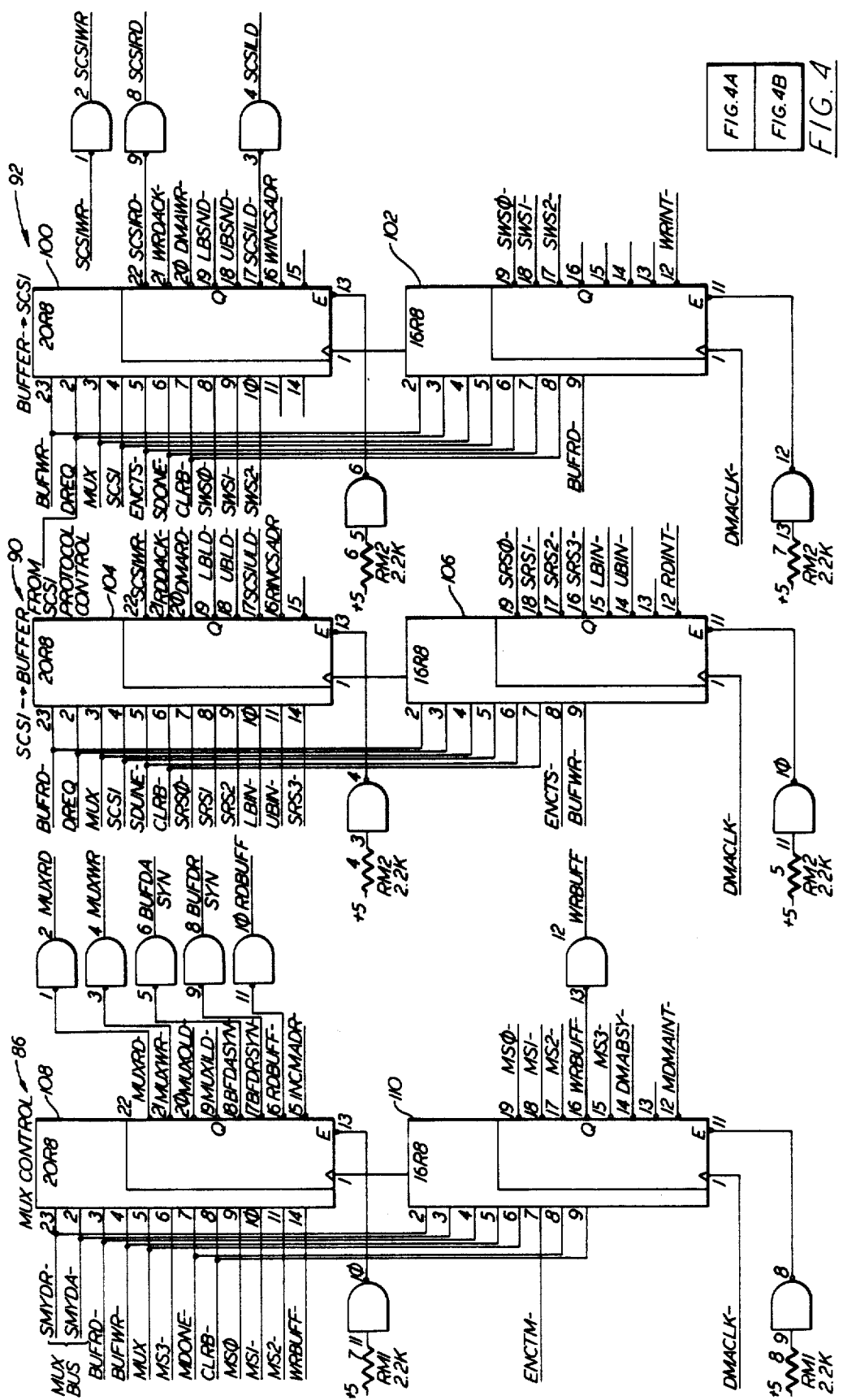
Figure 4B:
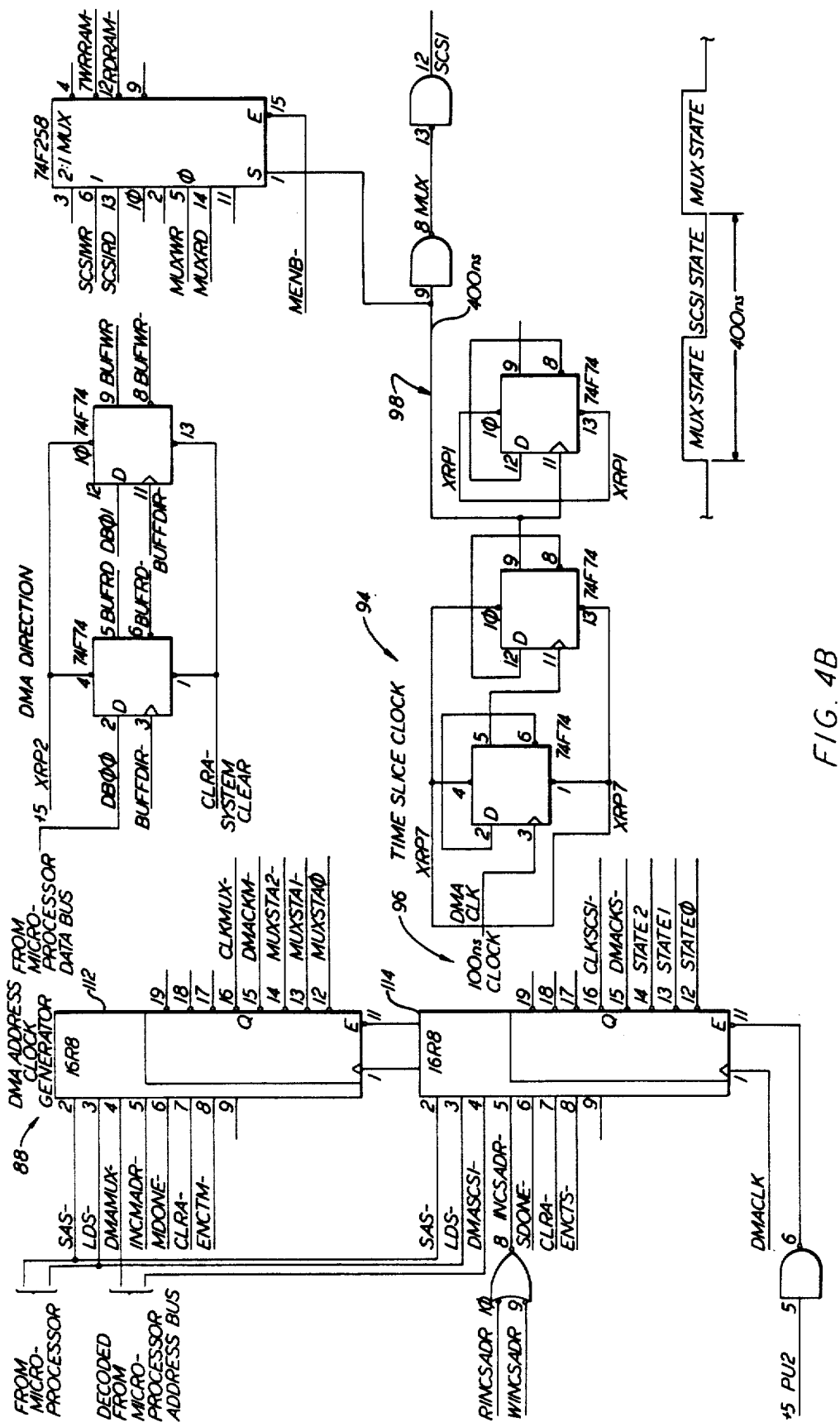

The buffer RAMs 36 are addressed by the address lines generated by the circuitry on FIG. 2 (lines BUFADR00-BUFADR11) and gated by the signal buffer write (BUFFWR-) which is generated in the circuitry on FIG. 3 from either the write RAM signal (WRRAM-) from the circuitry of FIG. 4 or from a delayed decoding of the signals from the microprocessor 20 indicating a transfer from the microprocessor data bus 28 to the buffer 36.

The buffer 36 is easily read by placing an address on the address leads (BUFADR00-BUFADR11) and allowing the signal buffer write (BUFFWR-) to go high which will be the case when a right operation is not in process. The data from the buffer 36 will be placed on the buffer data output lines labeled BD00-BD15. The buffer data output lines are coupled to registers 52, 54, 56 and 58 and also to line drivers 60 and 62. The registers 52, 54, 56 and 58 in the preferred embodiment comprise 74F374 circuits. The registers 52 and 54 are utilized to buffer the data from a particular address within buffer 36 and selectively gate one of the bytes to the SCSI data out bus labeled SCSDAT00-SCSDAT07. The registers 52 and 54 are loaded by the SCSI load signal (SCSILD) generated in FIG. 4. The lower byte is placed onto the SCSI data bus by the lower byte send signal (LBSND-) signal and the upper byte is placed onto the SCSI data bus by the upper byte send signal (UBSND-) generated in FIG. 4.

Data is unloaded from the buffer to the MUX bus by the registers 56 and 58. The registers 56 and 58 are loaded by the MUX output load signal (MUXOLD-) generated in FIG. 4 and the data in the registers 56 and 58 is placed onto the MUX bus by the concurrence of the read buffer signal (RDBUFF) generated in FIG. 4 and by a synchronized data request signal (SMYDR) from the MUX bus.

A data transfer from the buffer 36 to the data bus 28 coupled to the microprocessor 20 is accomplished by gating of the line driver 60 and 62 by the concurrence of the read signal (READ-) and the buffer select signal (BUFFER-).

The buffer 36 comprises four 1420S-45 circuits and is arranged in 16 pages with each page comprising 256 two byte long data words. The circuitry of FIG. 2 is operative to address the buffer 36 in this manner. To accomplish the page addressing, the circuitry of FIG. 2 includes two registers 64 and 66 which are coupled via a multiplexer circuit 68 to the four high order buffer address bit positions (BUFADR08-BUFADR11). The microprocessor 20 of the system is operative to load the page address for MUX bus transfers into the register 66 whenever the decoded signal from the decoder 70 on line 72 goes low. When this occurs, the data bus 28 from the microprocessor 20 positions DB08-DB11 are gated into the register 66 and are used for subsequent addressing of a particular page in the buffer 36 whenever a transfer is occurring either from or to the MUX bus.

In a similar fashion, the register 64 is utilized to store the page address specified by the microprocessor 20 for use with transfers either to or from the SCSI bus. The register 64 is activated to store the data bus bit positions DB08-DB11 when the decoder 74 causes it's output line 76 to go low.

The decoders 70 and 74 are operative to decode the address bus 26 positions AB01-AB03 coupled to the microprocessor to produce a low signal on the line 76 or 72 when the gating signals DMASCSI- and DMA-MUX- are respectively actuated by the microprocessor 20. Accordingly, the microprocessor 20 in accordance with the program running therein can selectively set page addresses into the registers 64 and 66 independently of each other. In this manner, the circuitry of the present invention ensures that an operation occurring on the MUX bus in conjunction with a particular page address in the buffer 36 is different from the page address associated with an operation occurring on the SCSI bus.

The remaining low order data bit positions of the address to the buffer 36 is generated either by the DMA address generator 78 or 80 depending on whether activity is occurring on the SCSI bus or the MUX bus respectively. The staring addresses are loaded into the generators 78 and 80 by the microprocessor 20. The DMA address generators 78 and 80, in the preferred embodiment, comprise AMD 2940 circuits. For the DMA address generator 78, whenever the increment SCSI address signal (INSCADR-) goes low, the address appearing on the output lines from the address generator 78 is incremented by one. In a similar fashion, when the DMA address generator 80 receives a signal on the line INCMADE-, the address in the generator 80 is incremented by one. The incrementing of the addresses in generators 78 and 80 makes it possible to easily step from one address to another when accessing the buffer 36 for purposes of either an SCSI bus transfer or a MUX bus transfer.

The address bit output of the generators 78 and 80 are coupled via multiplexer circuits 82 and 84 to the eight low order bit positions of the buffer input address lines BUFADR00-BUFADR07. The multiplexers 82 and 84 respond to the line ADRSEL which either gates the output from the generator 78 to the buffer address lines or the output of the generator 80 depending on the level of the ADRSEL. In a similar fashion, the multiplexer 68 gates the page address from the registers 64 or 66 as a function of the level on the line ADRSEL. The page address, as already indicated, appears on the buffer address lines BUFADR08-BUFADR11.

The circuitry of FIG. 4 provides most of the control signals for use by the circuitry illustrated in FIGS. 2 and 3. The control signals are primarily generated by four different sets of programmed array logic circuits 86, 88, 90 and 92. The particular manner in which each of these programmed array logic devices is configured will be described hereinafter in conjunction with a more detailed discussion of the manner in which they operate. The programmed array logic circuits 86 is utilized for control of the apparatus with respect to operations on the MUX bus. The programmed array logic circuits 88 is utilized in conjunction with DMA address clock signal generation. The programmed array logic circuits 90 is used in conjunction with transfers from the SCSI bus to the buffer and the programmed array logic circuits 92 is utilized for transfers from the buffer to the SCSI bus. A clock circuit is illustrated generally at 94 which receives a 100 nanosecond clock signal from an external clock circuit (not shown) at its input 96 and generates a 400 nanosecond clock signal at 98. The clock signal is utilized by the circuitry in accordance with the present invention such that for one half of the clock cycle at 98, the circuitry coupled thereto is operative to perform some form of operation relating to transfers between the MUX bus and the buffer. For the remainder of the cycle for the signal at 98, the circuitry coupled thereto is operative to perform operations related to the transfer of data between the buffer and the SCSI bus. In this manner, operations with the MUX bus and the SCSI bus are time multiplexed thereby permitting data transfer on these two buses which is as rapid as possible.

Figure 5:
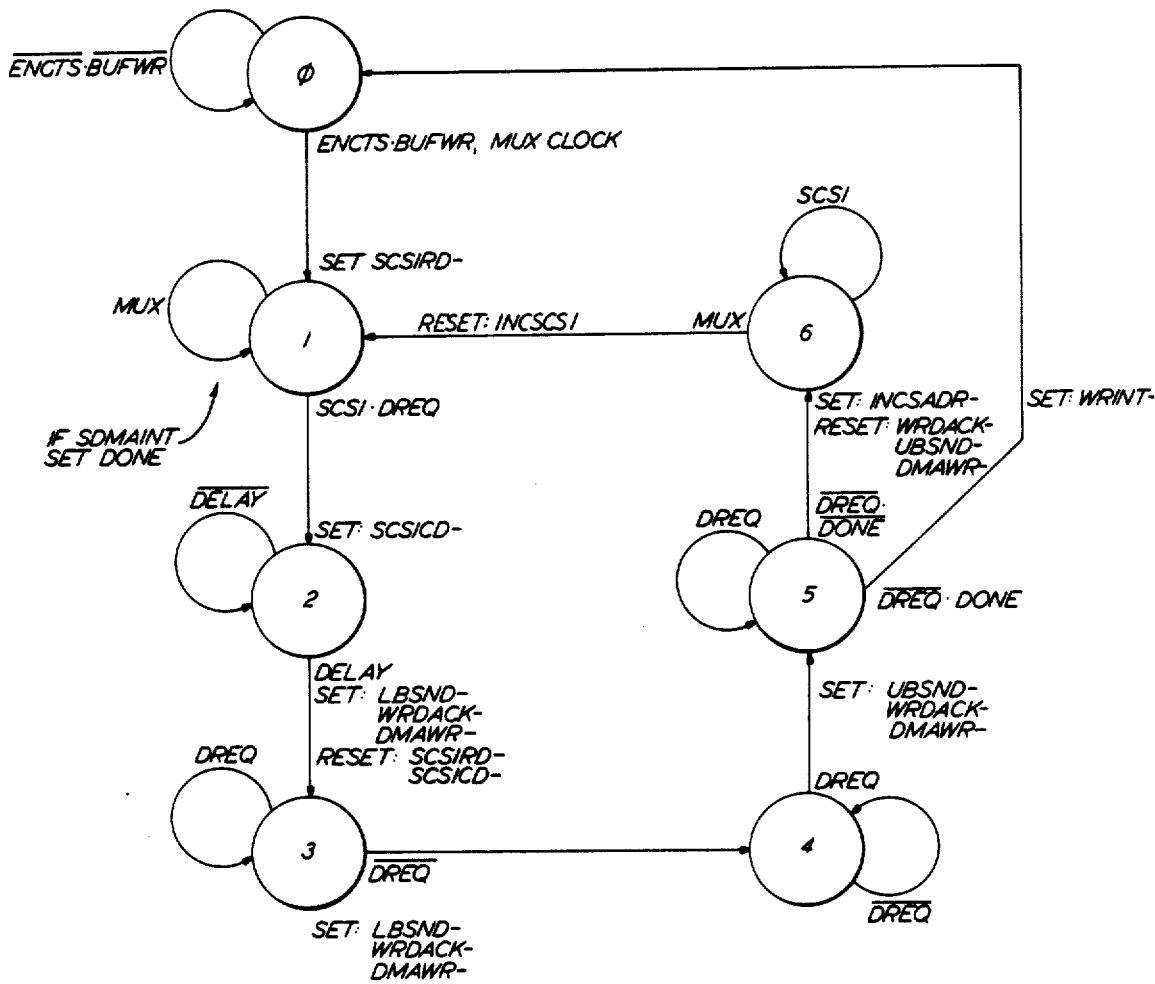
FIG. 5 is a state diagram for the buffer to SCSI driver circuitry in FIG. 4.

As already indicated, the programmed array logic circuit 92 is utilized to control transfers of data from the buffer to the SCSI bus. The programmed array logic circuits 92 sit in a zero state in response to a system reset signal which is generated when power is turned on. The state of the programmed circuits 92 remains in state zero until the enable counters SCSI DMA engine signal (ENCTS-) goes low and the buffer write (BUFWR-) also goes low. In addition, the MUX clock has to be active. When these conditions occur, the state of the program array logic circuit 92 shifts from state 0 to state 1 as illustrated in FIG. 5 and the SCSI read line (SCSIRD-) is activated. The programmed array logic circuits 92 remains in state 1 until the MUX signal goes away, the SCSI clock signal is active and a DMA request signal is received from the SCSI protocol controller on the line DREQ. When these three conditions occur, the state of the programmed array logic circuits 92 changes from state 1 to state 2 and the signal SCSILD- is made active.

State 2 is merely a delay state which serves to delay the setting of certain signals thereafter and resetting of other signals thereafter. Once leaving state 2, the programmed array logic circuit 92 cause the signals lower byte send (LBSND-), write DMA acknowledged (WRDACK-) and the DMA write enable signal (DMAWR-) to be activated. At the same time, the SCSI read (SCSIRD-) and the SCSI load (SCSILD-) signals are reset. The programmed logic array circuits 92 then enters state 3 waiting for the DMA request signal from the SCSI protocol controller to go away. When this occurs, the programmed array logic circuits 92 passes from state 3 to state 4 and in this process, the signal lower byte send (LBSND-), the write DMA acknowledge (WRDACK-) and the DMA write (DMAWR-) signals are reset.

The programmed array logic circuits 92 remain in state 4 until a new DMA request signal is received from the protocol controller at which time the programmed array logic circuits 92 pass from state 4 to state 5. In that process, the upper byte send (UBSND-) the write DMA acknowledge (WRDACK-) and the DMA write (DMAWR-) signals are made active. This causes the data to be gated from the SCSI bus into the upper byte buffer 42 in FIG. 3. Thereafter, upon the occurrence of the clock line BUFFWR-, the data in registers 40 and 42 are gated into the buffer 36.

The programmed array logic circuits 92 remain is state 5 until the DMA request signal from the SCSI protocol controller goes away. The departure from state 5 to state 6 requires that the DMA request from the SCSI protocol controller has gone away and that the data transfer is not complete as determined by the failure of the signal (SDONE-) to be present. When this occurs, the write data acknowledge signal (WRDACK-), the upper byte send (UBSND-) and the DMA write signal (DMAWR-) are reset and the increment storage address signal (INSCADR-) is activated thereby causing the address in generator 78 to be incremented.

In state 6, the programmed array logic circuits 92 wait until the multiplex clock cycle turns on and then the state goes to state 1 and the increment storage address signal (INCSCSI-) is reset. While in state 1, waiting for the next transfer request from the SCSI protocol control, if the next address of the buffer to be filled is the last one, the done signal (DONE) is activated. The done signal is utilized when leaving state 5 as no further data transfers are accepted over the SCSI bus until a new address is set into the generator 78 which must be done by the microprocessor 20. Accordingly, on leaving state 5 when the done (DONE) signal is active and the DMA request signal from the SCSI protocol controller is inactive, a write interrupt (WRINT-) signal is activated which interrupts the program in the microprocessor 20 thereby indicating that a transfer from the SCSI bus to the buffer has been completed for the current page of data in the buffer and that if further transfers are necessary, it is responsibility of the microprocessor 20 to reload the address buffers illustrated on FIG. 2 for continuing the data transfer.

Figure 6:
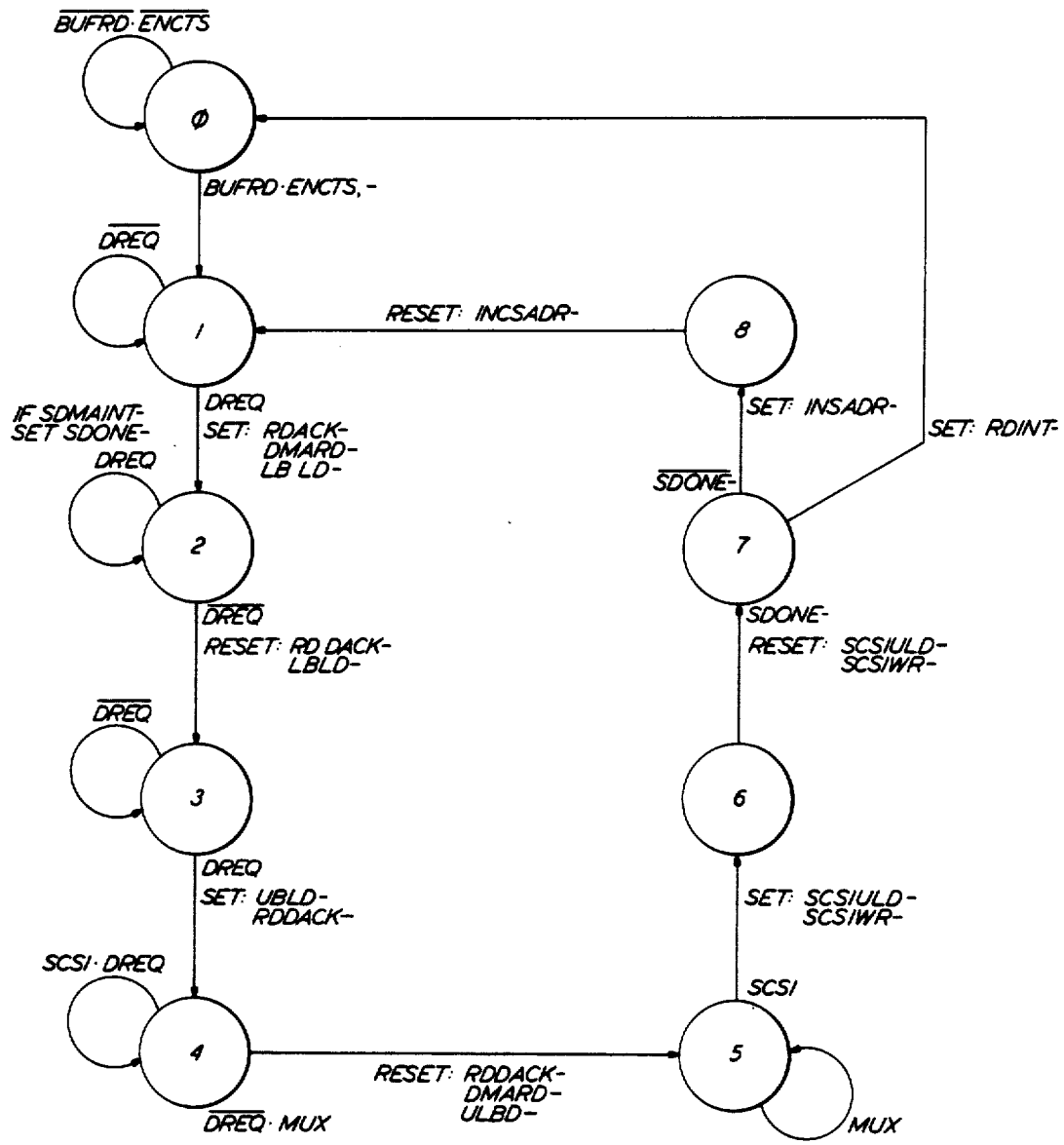
FIG. 6 is a state diagram for the SCSI to buffer control circuitry of FIG. 4.

FIG. 6 is a state diagram showing those states and signal actuations for transfers from the SCSI bus to the buffer. The state diagram is utilized in conjunction with the programmed logic array circuits 90.

Upon a system reset, the programmed array logic circuits 90 is at it's zero state and remains there until such time as the signal buffer read (BUFRD-) and the signal enable counters SCSI DMA engine (ENCTS-) are both active. When this occurs, the state of the programmed array logic circuit 90 changes to state 1. In transferring from state 1 to state 2, the staging register 40 is loaded from the SCSI bus. In state 1, the programmed array logic circuit 90 wait until a DMA request signal from the SCSI protocol controller (DREQ) is actuated. When this occurs, the read DMA acknowledge (RDDACK-) the DMA read (DMARD-) and the lower byte load (LBLD-) signals are actuated and the programmed array logic circuits 90 pass to state 2. In state 2, the programmed array logic circuits 90 wait for the DMA request signal from the SCSI protocol controller to go away. When this occurs, the programmed array logic circuits 90 pass from state 2 to state 3 and in the process reset the signals read DMA acknowledge (RDDACK-) and the lower byte load (LBLD-) signal.

Once in state 3, the programmed array logic circuits 90 wait until a subsequent DMA request signal is received from the SCSI protocol controller. When this occurs, the state changes from state 3 to state 4 and in the process, the upper byte load signal (UBLD-) and the read DMA acknowledge (RDDACK-) signal is actuated. At the same time, the data from the SCSI bus is gated into the staging register 42. Thereafter, when the proper gate signal (BUFFWR-) is actuated, the SCSI bus data is loaded into the buffer 36 from registers 40 and 42.

State 4 is a wait state for the programmed array logic circuits 90 wherein the state does not change until the beginning of a MUX cycle and the DMA request signal from the SCSI protocol controller (DREQ) is no longer present. When this occurs, the read DMA acknowledge (RDDACK-) the DMA read signal (DMARD-) and the upper load byte signal (ULBD-) are all reset.

Once in state 5, the programmed array logic circuits 90 wait for the next SCSI clock and thereafter sets the SCSI unload signal (SCSIULD-) and the SCSI write signal (SCSIWR-) to active thereby causing the staging registers 40 and 42 to be gated to the input of the buffer 36 thereby causing two bytes of data from the SCSI bus to be gated into the addressed location in the register 36. The buffer address is specified by the data in register 64 and generator 78.

Once in state 6, the programmed array logic circuits 90 pass immediately to state 7 and in the process the SCSI unload signal (SCSIULD-) and the SCSI write (SCSIWR-) signals are reset. Once in state 7 and if the data transfer is not done as indicated by the presence of the signal (SDONE-), then the programmed array logic circuits 90 pass to state 8 in the process of which the increment SCSI address signal (INSADR-) is activated. State 8 immediately goes to state 1 and in the process the signal increment SCSI address (INCSADR-) is reset.

Data transfers continue as defined by states 1–8 until, while in state 1, the signal SCSI DMA interrupt (SDMAINT-) is active. Then the done signal (SDONE-) is activated. Thereafter, a data transfer will occur in accordance with the operations described above in states 2–6. In state 7, the done signal (SDONE-) being active causes control to pass to state 0. In the process of doing so, the read interrupt signal (RDINT-) to the microprocessor is activated to indicate to the microprocessor 20 that the final data for the previously specified page has been stored into the buffer and that further instructions were necessary from the microprocessor 20 to permit further data transfer between the SCSI bus and the buffer.

Figure 7:
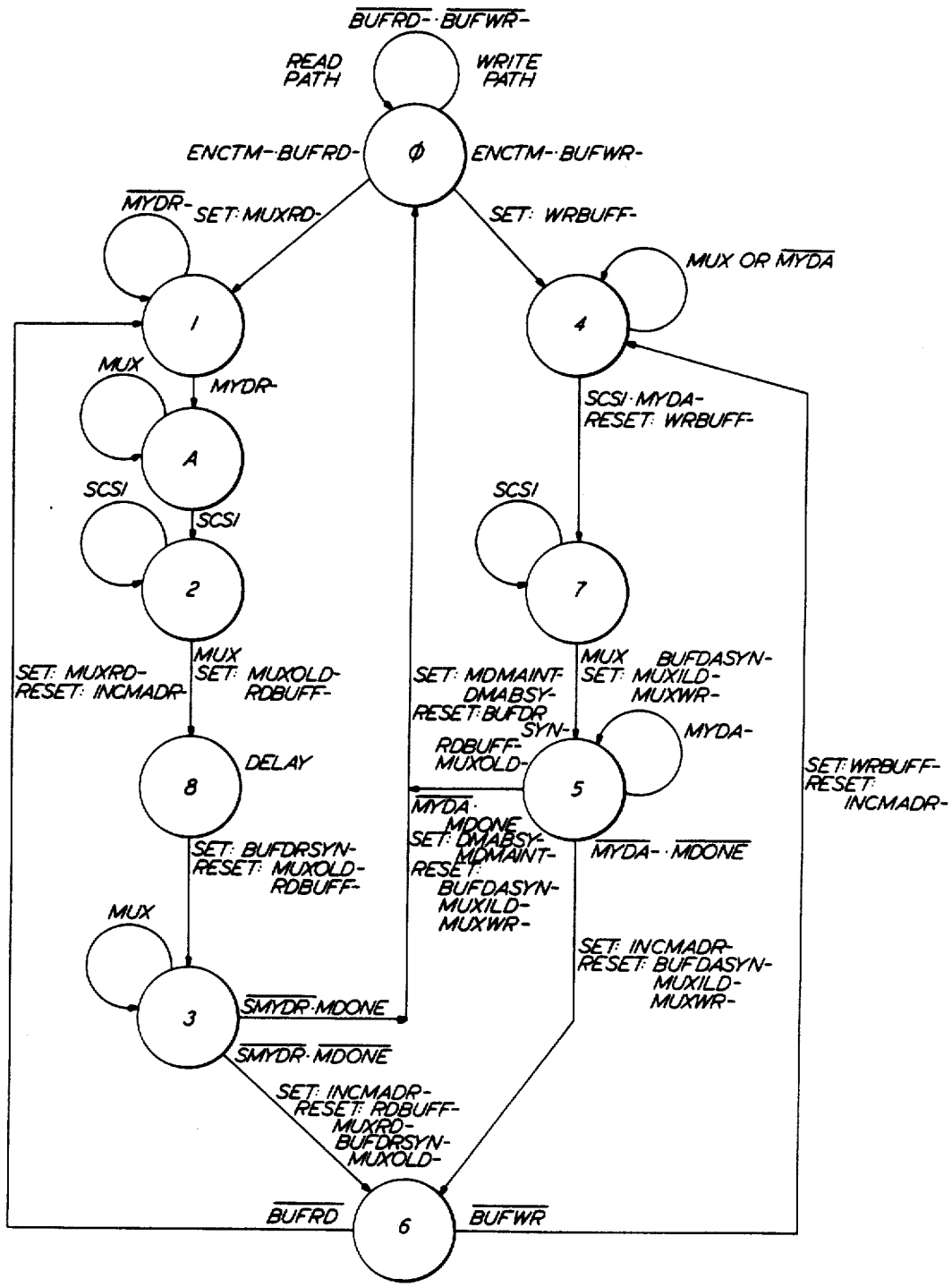
FIG. 7 is a state diagram for the MUX control circuits of FIG. 4.

Referring now to FIG. 7, a state diagram is shown for the MUX DMA control program array logic circuits 86. As with the other programmed array logic circuits, a system reset will cause this logic array 86 to go to it's 0 state. Thereafter, the state changes from state 0 to either state 1 or state 4 depending on the receipt of the enable counters SCSI DMA signals (ENCTM-) and either the read signal (BUFRD-) or the write signal (BUFWR-). When the read signal is received, the state changes from state 0 to state 1 and in the process the multiplex read (MUXRD-) signal is set. Once in state 1, the programmed array logic circuits 86 remain there until the data request signal (MYDR-) is received from the MUX bus. Then the state changes to state A wherein the programmed array logic circuit 86 waits until the next SCSI clock cycle. Thereat, the state changes from state A to state 2 and remains there until the beginning of the next MUX cycle clock. At that time, the state changes from state 2 to state 8 and in the process, the signals MUX outload (MUXOLD-) and the read buffer signal (RDBUFF-) are actuated. These signals cause the data in the location addressed by register 66 and generator 80 to appear at the output of the buffer 36 and to be gated to the output staging registers 56 and 58. Thereafter, the registers 56 and 58 are gated to the MUX bus.

State 8 is simply a delay state and the state immediately changes to state 3 for the programmed array logic circuits 86. In the process of going from state 8 to state 3, the buffer data request synchronize line (BUFDRSYN-) is set which is a signal to the MUX bus indicating that the data is good on the bus. At the same time, the MUX outload (MUXOLD-) and the read buffer (RDBUFF-) signals are reset. Once in state 3, the programmed array logic circuits 86 remain there until the data request from the MUX bus (SMYDR-) goes away. Then, if the MUX done signal (MDONE-) is not present, the state changes from state 3 to state 6 and in the process the increment address signal (INCMADR-) is set and the read buffer (RDBUFF-), MUX read (MUXRD-), buffer data request synchronize signal (BUFDRSYN-) and the MUX outload signal (MUXOLD-) is reset.

Once being in state 6, if the DMA buffer read signal is not present, the programmed array logic circuit 86 changes from state 6 to state 1. In the process of this state change, the MUX read signal (MUXRD-) is set and the increment multiplexer address signal (INCMADR-) is reset.

The data transfer will continue from the buffer to the MUX bus until the MUX DMA address generator 80 produces the done signal (MDONE-) when the last address is placed onto the data output bus therefrom. Then, when the programmed array logic circuits 86 reach state 3 and the synchronized data request (SMYDR-) from the MUX bus goes away, the state will change from state 3 to state 0. In the process of doing this, the MUX DMA interrupt signal (MDMAINT-) is set to interrupt the microprocessor 20 to advise that all the data in the current page has been transmitted from the buffer to the MUX bus and that the MUX DMA Control 32 must be reinitialized if further data transfers are desired. In addition, the buffer read synchronized signal (BUFDRSYN-), the read buffer signal (RDBUFF-) and the MUX outload (MUXOLD-) signals are reset and the DMA busy signal (DMABSY-) is set.

If the programmed logic array circuits 86 are in state 0 and a buffer write operation is indicated by the presence of the signal (BUFWR-) and the enable counters signal (ENCTM-) is present, the state changes from state 0 to state 4. The programmed array logic circuits 86 remain in state 4 until the SCSI clock occurs and the data acknowledge signal (MYDA-) is received from the MUX bus. when this occurs, the programmed array logic circuits 86 change from state 4 to state 7 and in the process, the write buffer signal (WRBUFF-) is reset. The state remains in state 7 until the beginning of the next MUX clock cycle whereat the state changes from 7 to 5. In this state change, the buffer data acknowledge synchronized signal (BUFDASYN-), the MUX inload signal (MUXILD-) and the MUX write (MUXWR-) are set. The setting of these signals causes the data on the MUX bus to be gated into the buffer 36.

The programmed array logic circuits 86 remain in state 5 until the data acknowledge signal (MYDA-) goes away. Then, depending on the status of the MUX done (MDONE-) signal the state changes either from state 5 to state 6 or from state 5 to state 0. The state change from 5 to 6 occurs when more data remains to be filled into the page in the buffer which is currently being filled from the MUX bus. In this case, the MUX done signal (MDONE-) is not present and accordingly, the state change is from 5 to 6. In this state change, the MUX address is incremented by the increment signal (INCMADR-) being set and the signals BUFDASYN-, MUXILD- and MUXWR- are reset. From state 6, the state change is back to state 4 as the signal BUFWR- is not present and in the process of this state change the write buffer signal (WRBUFF-) is set and the increment multiplex address signal (INCMADR-) is reset.

Data transfers will continue from the MUX bus to the buffer until the last address position of the current page is filled whereat the MUX done (MDONE-) signal becomes active and the state change from state 5 is to state 0. When this occurs, the signals BUFDASYN-, MUXILD-, MUXWR- are reset and the signals DMABSY- and MDMAINT- are set. The programmed array logic circuits 86 then return to state 0 and remains there until a further multiplex bus operation is initiated by the microprocessor 20.

Figure 8:
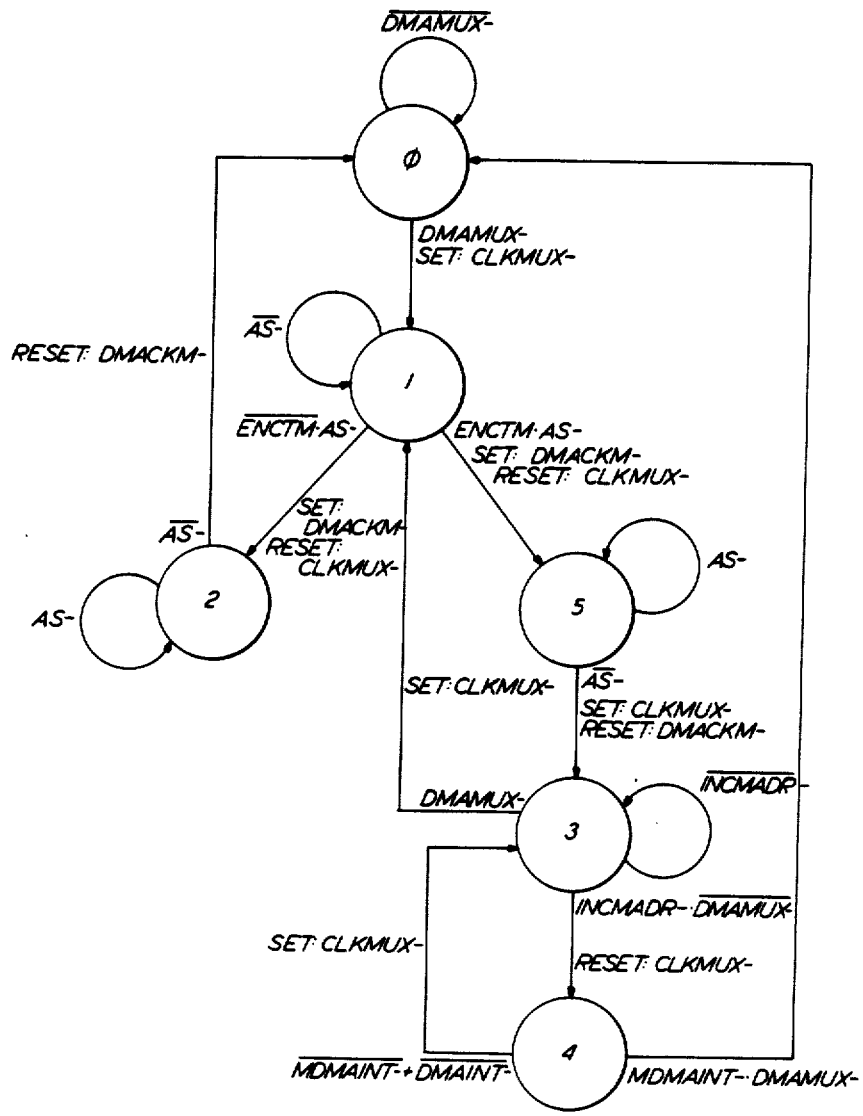
FIG. 8 is a state diagram for the DMA address clock generator controls of FIG. 4.

The DMA address clock generator programmed array logic circuits 88 are configured in accordance with the state diagram of FIG. 8. When the system reset occurs, the circuits 88 are in state 0 where they remain until the enable for MUX DMA registers (DMAMUX-) occurs. When this happens, the state changes from state 0 to state 1 and in the process the clock MUX signal (CLKMUX-) is set. The circuits 88 remain in state 1 until the address strobe signal (AS-) is received from the microprocessor 20. Then, depending on the state of the enable MUX counter signal, the state changes either from 1 to 2 or from 1 to 5. When the enable counters signal (ENCTM-) is not present, the state change is to state 2 and in the process the DMA acknowledge (DMACKM-) is set and the clock MUX (CLKMUX-) signal is reset. The circuits 88 remain in state 2 until the address strobe (AS-) goes away and then the circuits 88 return to state 0. In the process, the signal DMACKM- is reset.

When the circuits 88 are in state 1 and the address strobe is present and the enable counter signal (ENCTM-) is present, the circuits 88 change from state 1 to state 5 and in the process the DMA acknowledge signal (DMACKM-) is set and the clock MUX signal (CLKMUX-) is reset. The circuits 88 remain in state 5 until the address strobe (AS-) goes away and then the state changes from 5 to 3. In the process of this state change, the clock MUX signal (CLKMUX-) is set and the DMA acknowledge (DMACKM-) is reset. The circuits 88 thereafter remain in state 3 until the increment multiplexer address signal (INCMADR-) goes active and the enable MUX DMA registers (DMAMUX-) is not present. Then, the state change is from state 3 to state 4. In this state change, the clock MUX signal (CLKMUX-) is reset.

The exit from state 4 depends on the status of the enable bus DMA register (DMAMUX-) and the DMA interrupt signal (MDMAINT-). If both signals are present then the state change is from state 4 to state 0. If neither signals are present then the state change is from state 4 to state 3 and in the process the clock MUX signal (CLKMUX-) is set.

In the event that the circuits 88 are in state 3 and the DMA MUX signal (DMAMUX-) goes active, the state change is from state 3 to state 1 and, in the process of this state change, the clock MUX signal (CLKMUX-) is set.

The following table is a listing of the logic equations for each of the programmed array logic circuits:

| PAL 100 EQUATIONS | | |
|---|---|---|
| SCSIRD | = /SWS0*/SWS1*/SWS2*BUFWR*ENCTS*/CLR | ; S0→S1 |
|  | + SWS0*/SWS1*/SWS2*/CLR | ; S1→S2 |
|  | + /SWS0*SWS1*/SWS2*/DREQ*/CLR | ; STAY S2 |
|  | + /SWS0*SWS1*SWS2*/CLR | ; S6→S1 |
| WRDACK | = /SWS0*SWS1*/SWS2*DREQ*/CLR | ; S2→S3 |
|  | + SWS0*SWS1*/SWS2*DREQ*/CLR | ; STAY S3 |
|  | + /SWS0*/SWS1*SWS2*DREQ*/CLR | ; S4→S5 |
|  | + SWS0*/SWS1*SWS2*DREQ*/CLR | ; STAY S5 |
| DMAWR | = /SWS0*SWS1*/SWS2*DREQ*/CLR | ; S2→S3 |
|  | + SWS*SWS1*/SWS2*DREQ8/CLR | ; STAY S3 |
|  | + /SWS0*/SWS1*SWS2*DREQ*/CLR | ; S4→S5 |
|  | + SWS0*/SWS1*SWS2*DREQ*/CLR | ; STAY S5 |
| LBSND | = /SWS0*SWS1*/SWS2*DREQ*/CLR | ; S2→S3 |
|  | + SWS0*SWS1*/SWS2*DREQ*/CLR | ; STAY S3 |
| UBSND | = /SWS0*/SWS1*SWS2*DREQ*/CLR | ; S4→S5 |
|  | + SWS0*SWS1*SWS2*DREQ*/CLR | ; STAY S5 |
| SCSILD | = SWS0*/SWS1*/SWS2*SCSI*DREQ*CLR*SCSIRD | ; S1→S2 |
|  | + /SWS0*SWS1*/SWS2*/CLR*SCSIRD | ; STAY S2 |
| INCSADR | + SWS0*/SWS1*SWS2*/DREQ*/CLR*/SDMAINT | ; S5→S6 |

| PAL 102 EQUATIONS | | |
|---|---|---|
| SWS0 | = /SWS0*/SWS1*/SWS2*BUFWR*ENCTS*/CLR*MUX | ; S0→S1 |
|  | + SWS0*/SWS1*/SWS2*/DREQ*/CLR*/BUFRD | ; STAY S1 |
|  | + SWS0*/SWS1*/SWS2*MUX*/CLR*/BUFRD*DREQ | ; STAY S1 |
|  | + /SWS0*SWS1*/SWS2*DREQ*/CLR | ; S2→S3 |
|  | + SWS0*SWS1*/SWS2*/DREQ8/CLR | ; STAY S3 |
|  | + /SWS0*/SWS1*SWS2*DREQ*/CLR | ; S4→S5 |
|  | + SWS0*/SWS1*SWS2*DREQ*/CLR | ; STAY S5 |
|  | + /SWS0*SWS1*SWS2*/CLR*MUX | ; S6→S1 |
| SWS1 | = SWS0*/SWS1*/SWS2*/MUX*/CLR*/BUFRD*DREQ | ; S1→S2 |
|  | + /SWS0*SWS1*/SWS2*DREQ*/CLR | ; S2→S3 |
|  | + /SWS0*SWS1*/SWS2*/DREQ*/CLR*/BUFRD | ; STAY S2 |
|  | + SWS0*SWS1*/SWS2*DREQ*/CLR | ; STAY S3 |
|  | + SWS*/ SWS1*SWS2*/DREQ*/CLR*/DONE | ; S5→S6 |
|  | + /SWS0*SWS1*SWS2*/MUX*/CLR | ; STAY S6 |
| SWS2 | = SWS0*SWS1*/SWS2*/DREQ*/CLR | ; S3→S4 |
|  | + /SWS0*/SWS1*SWS2*/DREQ*/CLR | ; STAY S4 |
|  | + /SWS0*/SWS1*SWS2*DREQ*/CLR | ; S4→S5 |
|  | + SWS0*/SWS1*SWS2*DREQ*/CLR | ; STAY S5 |
|  | + SWS0*/SWS1*SWS2*/DREQ*/CLR*/DONE | ; S5→S6 |
|  | + /SWS0*SWS1*SWS2*/MUX*/CLR | ; STAY S6 |

| PAL 104 EQUATIONS | | |
|---|---|---|
| WRINT | = SWS0*/SWS1*SWS2*DONE*/DREQ*/CLR | ; S5 |
|  | + /SWS0*/SWS1*/SWS2*SDMAINT*BUFWR*/CLR | ; S0 |
| SCSIWR | = SRS0*/SRS1*SRS2*/SRS3*SCSI*/CLR | ; S5→S6 |
| RDDACK | = SRS0*/SRS1*/SRS2*/SRS3*DREQ*/CLR | ; S1→S2 |
|  | + /SRS0*SRS1*/SRS2*/SRS3*DREQ*/CLR | ; STAY S2 |
|  | + SRS0*SRS1*/SRS2*/SRS3*DREQ*/CLR | ; S3→S4 |
|  | + /SRS0*SRS1*SRS2*/SRS3*DREQ*/CLR | ; STAY S4 |
| DMARD | = SRS0*/SRS1*/SRS2*/SRS3*DREQ*/CLR | ; S1→S2 |
|  | + /SRS0*SRS1*/SRS2*/SRS3*DREQ*/CLR | ; S2 |
|  | + SRS0*SRS1*/SRS2*/SRS3*DREQ*/CLR | ; S3 |
|  | + /SRS0*SRS1*SRS2*/SRS3*DREQ*/CLR | ; STAY S4 |
| LBLD | = SRS0*/SRS1*/SRS2*SRS3*DREQ*/CLR | ; S1→S2 |
|  | + /SRS0*SRS1*/SRS2*/SRS3*DREQ*/CLR | ; STAY S2 |
| UBLD | = SRS0*SRS1*/SRS2*/SRS3*DREQ*/CLR | ; S3→S4 |
|  | + /SRS0*SRS1*SRS2*/SRS3*DREQ*/CLR | ; STAY S4 |
| SCSIULD | = SRS0*/SRS1*SRS2*/SRS3*SCSI*/CLR | ; S5→S6 SCSI |

PAL 104 EQUATIONS

| | | |
|---|---|---|
| RINCSADR | = SRS0*SRS1*SRS2*/SRS3*/SDMAINT*/CLR | ; S7→S8 |

PAL 106 EQUATIONS

| | | |
|---|---|---|
| SRS0 | = /SRS0*/SRS1*/SRS2*/SRS3*BUFRD*ENCTS*/CLR | ; S0→S1 |
| | + SRS0*/SRS1*/SS2*/SRS3*/DREQ*CLR*/BUFWR | ; STAY S1 |
| | + /SRS0*SRS1*/SRS2*/SRS3*/DREQ*/CLR | ; S2→S3 |
| | + /SRS0*/SRS1*SRS2*/SRS3*/DREQ*/CLR*MUX | ; S4→S5 |
| | + /SRS0*/SRS1*SRS2*/SRS3*MUX/8/CLR | ; STAY S5 |
| | + /SRS0*SRS1*SRS2*/SRS3*/CLR | ; S6→S7 |
| | + /SRS0*/SRS1*/SRS2*SRS3*/CLR | ; S8→S1 |
| SRS1 | = SRS0*/SRS1*/SRS2*/SRS3*DREQ*/CLR | ; S1→S2 |
| | + /SRS0*SRS1*/SRS2*/SRS3*DREQ*/CLR | ; STAY S2 |
| | + /SRS0*SRS1*/SRS2*/SRS3*/DREQ*/CLR | ; S2→S3 |
| | + SRS0*SRS1*/SRS2*/SRS3*/DREQ*/CLR | ; STAY S3 |
| | + /SRS0*/SRS1*SRS2*/SRS3*SCSI*/CLR | ; S5→S6 |
| | + /SRS0*SRS1*SRS2*/SRS3*/CLR | ; S6→S7 |
| SRS2 | = SRS0*SRS1*/SRS2*/SRS3*DREQ*/CLR | ; S3→S4 |
| | + /SRS0*/SRS1*SRS2*/SRS3*DREQ*/CLR | ; STAY S4 |
| | + /SRS0*/SRS1*SRS2*/SRS3*/DREQ*/CLR*MUX | ; S4→S5 |
| | + /SRS0*/SRS1*SRS2*/SRS3*MUX*/CLR | ; STAT S5 |
| | + /SRS0*/SRS1*SRS2*/SRS3*SCSI*/CLR | ; S5→S6 |
| | + /SRS0*SRS1*SRS2*/SRS3*/CLR | ; S6→S7 |
| | + /SRS0*/SRS1*SRS2*/SRS3*/DREQ*SCSI | ; STAY S4 |
| SRS3 | = SRS0*SRS1*SRS2*/SRS3*/CLR*/DONE | ; S7→S8 |
| RDINT | = SRS0*SRS1*SRS2*/SRS3*DONE*/DREQ*/CLR | ; S7 |
| | + /SRS0*/SRS1*/SRS2*/SRS3*SDMAINT*BUFRD*/CLR | ; S0 |

PAL 108 EQUATIONS

| | | |
|---|---|---|
| MUXRD | = /MS0*MS1*/MS2*/MS3*/CLR | ; S2→S8 |
| | + /MS0*MS1*/MS2*MS3*/CLR | ; SA |
| MUXWR | = MS0*MS1*/MS2*/MS3*MUX*.CLR | ; S4→S7 |
| MUXOLD | = /MS0*MS1*/MS2*/MS3*MUX*MYDR*/CLR | ; S2→S5 DR*MUX |
| MUXILD | = MS0*MS1*/MS2*/MS3*MUX*/CLR | ; S4→S7 DA*MUX |
| BFDASYN | = MS0*MS1*MS2*/MS3*/CLR | ; S7→S5 |
| | + MS0*/MS1*MS2*/MS3*MYDA*/CLR | ; STAY 5 |
| | + /MS0*/MS1*/MS2*/MS3*MYDA*MDMAINT*/CLR*BUFWR | ; S0 |
| BFDRSYN | = /MS0*/MS1*/MS2*MS3*/CLR | ; S8→S3 |
| | + MS0*/MS1*/MS2*MS3*MYDR*/CLR | ; STAY 3 DR ACTIVE |
| | + /MS0*/MS1*/MS2*/MS3*MYDR*MDMAINT*/CLR*BUFRD | ; S0 |
| RDBUFF | = /MS0*MS1*/MS2*/MS3*/CLR | ; S2→S8 |
| | + MS0*MS1*/MS2*/MS3*MYDR*/CLR | ; STAY 3 |
| | + /MS0*/MS1*/MS2*MS3*/CLR | ; S8→S3 |
| | + /MS0*/MS1*/MS2*/MS3*MYDR*MDMAINT*/CLR*BUFRD | ; S0 |
| INCMADR | = MS0*MS1*/MS2*/MS3*/MYDR*/MDMAINT*/CLR | ; S3→S6 |
| | + MS0*/MS1*MS2*/MS3*/MYDA*/MDMAINT*/CLR | ; S5→S6 |

PAL 110 EQUATIONS

| | | |
|---|---|---|
| MS0 | = /MS0*/MS1*/MS2*/MS3*BUFRD*/CLR*/BUFWR*ENCTM | ; S0→S1 |
| | + MS0*/MS1*/MS2*/MS3*/MYDR*/CLR*/BUFWR | ; STAY 1 /MYDR |
| | + /MS0*/MS1*/MS2*MS3*/CLR | ; S8→S3 |
| | + MS0*MS1*/MS2*/MS3*MYDR*/CLR*/MDMAINT | ; STAY 3 |
| | + /MS)*/MS1*MS2*/MS3*/MUX*MYDA*/CLR | ; S4→S7 MUX*DA |
| | + MS0*MS1*MS2*/MS3*/CLR | ; S7-S5 |
| | + /MS0*/MS1*MS2*/MS3*MYDA*/CLR*/MDMAINT | ; STAY 5 |
| | + /MS0*MS1*MS2*/MS3*BUFRD*/CLR | ; S6→S1 |
| MS1 | = MS0*/MS1*/MS2*/MS3*MYDR*/CLR | ; S1→SA |
| | + /MS0*/MS1*/MS2*MS3*/CLR | ; S8→S3 |
| | + MS0*MS1*/MS2*/MS3*/CLR*/MDMAINT | ; S3 |
| | + MS0*/MS1*MS2*/MS3*/MYDA*/CLR*MDMAINT | ; S5→S6 |
| | + /MS0*/MS1*MS2*/MS3*/MUX*MYDA*/CLR | ; S4-S7 |
| | + /MS0*MS1*/MS2*/MS3*/CLR | ; STAY SA,S2 |

-continued

PAL 110 EQUATIONS

| | | |
|---|---|---|
| | + /MS0*MS1*/MS2*/MS3*/MUX*/CLR | ; STAY S2 |
| | + MS0*MS1*MS2*/MS3*/MUX*/CLR | ; STAY S7 |
| MS2 | = MS0*MS1*/MS2*/MS3*/MYDR*/CLR*/MDMAINT | ; S3→S6 |
| | + /MS0*/MS1*/MS2*/MS3*BUFWR*/CLR*/BUFRD*ENCTM | ; S0→S4 |
| | + /MS0*/MS1*MS2*/MS3*/MUC*MYDA*/CLR | ; S4-S7 |
| | + /MS0*/MS1*MS2*/MS3*/MYDA*/CLR*/BUFRD | ; STAY S4 |
| | + /MS0*/MS1*MS2*/MS3* MYDA*MUX/CLR | ; STAY S4 |
| | + MS0*MS1*MS2*/MS3*/CLR | ; S7-S5 |
| | + /MS0*MS1*MS2*/MS3*BUFWR*/CLR | ; S6-S4 |
| | + MS0*/MS1*MS2*/MS3*/MDMAINT*/CLR | ; S5→S6 |
| | | STAY S5 |
| MS3 | = /MS0*MS1*/MS2*/MS3*/CLR*MUX | ; S2→S8 |
| | + MS0*/MS1*/MS2*/MS3*MYDR*/CLR | ; S1-SA |
| | + /MS0*MS1*/MS2*MS3*MUX*/CLR | ; STAY SA |
| WRBUFF | = /MS0*/MS1*/MS2*/MS3*BUFWR*/CLR*/BUFRD*ENCTM* | ; S0→S4 |
| | + /MS0*MS2*/MS2*/MS3*/MYDA*/CLR | ; STAY S4 /DA |
| | + /MS0*/MS1*MS2*/MS3*/MUX*/CLR*MYDA | ; STAY S4 SCSI |
| | + /MS0*MS1*MS2*/MS3*/CLR*BUFWR | ; S6-S4 |
| DMABSU | = MS0*MS1*/MS2*/MS3*MDMAINT*/CLR*/MYDR | ; S3→S0 |
| | + MS0*/MS1*MS2*/MS3*MDMAINT*/CLR*/MYDA | ; S5→S0 |
| | + /MS0*/MS1*/MS2*/MS3*/MYDA*MDONE*BUFWR*/CLR | ; S0 |
| | + /MS0*/MS1*/MS2*/MS3*/MYDR*MDONE*BUFRD*/CLR | ; S0 |
| MDMAINT | = MS0*MS1*/MS2*/MS3*MDMAINT*/CLR | ; S3→S0 |
| | + MS0*/MS1*MS2*/MS3*MDMAINT*/CLR | ; S5→S0 |
| | + /MS0*/MS1*/MS2*/MS3*MDONE*MDMAINT*/CLR | ; S0 |

PAL 112 EQUATIONS

| | | |
|---|---|---|
| CLKMUX | = /MUXSTA0*/MUXSTA1*/MUXSTA2*DMAMUX*/CLR | ; S0-S1 |
| | + MUXSTA0*/MUXSTA1*/MUXSTA2*/AS*/CLR | ; S1 |
| | + MUXSTA0*/MUXSTA1*MUXSTA2*/AS*/CLR | ; S5-S3 |
| | + MUXSTA0*MUXSTA1*/MUXSTA2*/INCMADR*/CLR | ; S3 |
| | + MUXSTA0*MUXSTA1*/MUXSTA2*DMAMUX*/CLR | ; S3-S1 |
| | + /MUXSTA0*/MUXSTA1*MUXSTA2*/MDMAINT*/CLR | ; S4-S3 |
| | + /MUXSTA0*/MUXSTA1*MUXSTA2*/DMAMUX*/CLR | ; S4-S3 |
| DMACKM | = MUXSTA0*/MUXSTA1*/MUXSTA2*AS*/ENCTM*/CLR | ; S1-S2 |
| | + MUXSTA0*/MUXSTA1*/MUXSTA2*AS*ENCTM*/CLR | ; S1-S5 |
| | + /MUXSTA0*MUXSTA1*/MUXSTA2*AS*/CLR | ; S2 |
| | + MUXSTA0*/MUXSTA1*MUXSTA2*AS*/CLR | ; S5 |
| MUXSTA0 | = /MUXSTA0*/MUXSTA1*/MUXSTA2*DMAMUX*/CLR | ; S0-S1 |
| | + MUXSTA0*/MUXSTA1*/MUXSTA2*/AS*/CLR | ; S1 |
| | + MUXSTA0*/MUXSTA1*/MUXSTA2*ENCTM*AS*/CLR | ; S1-S5 |
| | + MUXSTA0*/MUXSTA1*MUXSTA2*/CLR | ; S5 |
| | + MUXSTA0*MUXSTA1*/MUXSTA2*/INCMADR*/CLR | ; S3 |
| | + /MUXSTA0*/MUXSTA1*MUXSTA2*/MDMAINT*/CLR | ; S4-S3 |
| | + /MUXSTA0*/MUXSTA1*MUXSTA2*/DMAMUX*/CLR | ; S4-S3 |
| | + MUXSTA0*MUXSTA1*/MUXSTA2*DMAMUX*/CLR | ; S3-S1 |
| MUXSTA1 | = MUXSTA0*/MUXSTA1*/MUXSTA2*AS*/ENCTM*/CLR | ; S1-S2 |
| | + /MUXSTA0*MUXSTA1*/MUXSTA2*AS/CLR | ; S2 |
| | + /MUXSTA0*/MUXSTA1*MUXSTA2*/MDMAINT*/CLR | ; S4-S3 |
| | + /MUXSTA0*/MUXSTA1*MUXSTA2*/DMAMUX*/CLR | ; S4-S3 |
| | + MUXSTA0*/MUXSTA1*MUXSTA2*/AS*/CLR | ; S5-S3 |
| | + MUXSTA0*MUXSTA1*/MUXSTA2*/INCMADR*/DMAMUX*/CLR | ; S3 |
| MUXSTA2 | = MUXSTA0*MUXSTA1*/MUXSTA2*INCMADR*/DMAMUX*/CLR | ; S3-S4 |
| | + MUXSTA0*/MUXSTA1*/MUXSTA2*ENCTM*AS*CLR | ; S1-S5 |
| | + MUXSTA0*/MUXSTA1*MUXSTA2*AS*/CLR | ; S5 |

PAL 114 EQUATIONS

| | | |
|---|---|---|
| CLKSCSI | = /STATE0*/STATE1*/STATE2*DMASCHSI*/CLR | ; S0-S1 |
| | + STATE0*/STATE1*/STATE2*/AS*/CLR | ; S1 |
| | + STATE0*/STATE1*STATE2*/AS*/CLR | ; S5-S3 |
| | + STATE0*STATE1*/STATE2*/INSCADR*/CLR | ; S3 |
| | + STATE0*STATE1*/STATE2*DMASCSI*/CLR | ; S3-S0 |
| | + /STATE0*/STATE1*STATE2*/SDMAINT*/CLR | ; S4-S3 |
| | + /STATE0*/STATE1*STATE2*/DMASCSI*/CLR | ; S4-S3 |
| DMACKS | = STATE0*/STATE1*/STATE2*AS*/ENCTS*/CLR | ; S1-S2 |
| | + STATE0*/STATE1*/STATE2*AS*ENCTS*/CLR | ; S1-S5 |
| | + /STATE0*/STATE1*/STATE2*AS*/CLR | ; S2 |

-continued

| | PAL 114 EQUATIONS | |
|---|---|---|
| STATE0 | + STATE0*/STATE1*STATE2*AS*/CLR<br>= /STATE0*/STATE1*/STATE2*DMASCI*/CLR<br>+ STATE0*/STATE1*/STATE2*/AS*/CLR<br>+ STATE0*/STATE1*/STATE2*ENCTS*AS*/CLR<br>+ STATE0*/STATE1*STATE2*/CLR<br>+ STATE0*STATE1*/STATE2*/INCSADR*/CLR<br>+ /STATE0*/STATE1*STATE2*/SDMAINT*/CLR<br>+ /STATE0*/STATE1*STATE2*/DMASCSI*/CLR<br>+ STATE0*STATE1*/STATE2*DMASCSI*/CLR | ; S5<br>; S0-S1<br>; S1<br>; S1-S5<br>; S5<br>; S3<br>; S4-S3<br>; S4-S3<br>; S3-S1 |
| STATE1 | = STATE0*/STATE1*/STATE2*AS*/ENCTS*/CLR<br>+ /STATE0*STATE1*/STATE2*AS*/CLR<br>+ /STATE0*/STATE1*STATE2*/SDMAINT*/CLR<br>+ /STATE0*/STATE1*STATE2*/DMASCSI*/CLR<br>+ STATE0*/STATE1*STATE2*/AS*/CLR<br>+ STATE0*STATE1*/STATE2*/INCSADR*/ DMASCSI*/CLR | ; S1-S2<br>; S2<br>; S4-S3<br>; S4-S3<br>; S5-S3<br>; S3 |
| STATE2 | = STATE0*STATE1*/STATE2*INCSADR*/DMASCI*/CLR<br>+ STATE0*/STATE1*/STATE2*ENCTS*AS*CLR<br>+ STATE0*/STATE1*STATE2*AS/CLR | ; S3-S4<br>; S1-S5<br>; S5 |

The foregoing description has completely described the hardware and the states of the programmed array logic circuits for generating various of the control signals utilized by the hardware illustrated in FIG. 1. In addition to this hardware and it's operation, the microprocessor 20 of FIG. 1 executes a program which is operative to oversee the operation of the transfer of data between the MUX bus 12 and the SCSI bus 14. The most pertinent functions performed by this program will now be described in greater detail.

The software for controlling the microprocessor 20 is located within the ROM 24. For convenience and for speed of operation, during system power up, the program contained in the ROM 24 is transferred to the RAM 22 and thereafter executed out of RAM. This is done because the RAM access speed is faster than that for ROM and, accordingly, the microprocessor can operate faster when operating on a program stored in RAM 22.

The program is set forth below in the C programming language. This program listing is compiled to produce native code for the particular microrpcessor which is utilized and this code is then permanently recorded into the ROM 24 so that on power up it can be transferred to the RAM 22.

Once a data transfer has been initiated, for example, to transfer data from a device coupled to the SCSI bus to some computer system facility coupled to the MUX bus 12, the microprocessor 20 performs the necessary functions to control the MUX DMA control 32 and the SCSI DMA control 34 which in turn control the operation of the dual access buffer 36. In such a transfer from the SCSI bus 14 to the MUX bus 12, the microprocessor 20 first causes the SCSI DMA control 34 to be set up for the purpose of transferring a page of data into the buffer 36. In accomplishing this function, the microprocesor 20 loads a page address into the SCSI DMA control circuit 34. This address constitutes the first address in the buffer 36 to which two bytes of data are transmitted from the SCSI bus 14. The data transfer is controlled by the SCSI DMA control circuit 34 in a manner which is evident from the hardware description above until such time as the last available address in the page is filled. When this occurs, as has already been indicated, the SCSI DMA control circuit 34 produces an interrupt to the microprocessor 20 which informs the micro-processor that the page in the buffer 36 has been filled. Assuming that further data is to be fransmitted from the SCSI bus 14, the microprocessor 20 then initiates a new command to the SCSI control 34 specifying a new page address for receiving the additional data from the SCSI bus into data locations within that page. The microprocessor 20 also sends a command to the MUX DMA control 32 to cause it to initiate a data transfer from the buffer 36 to the MUX bus 12. The page address sent to the MUX DMA control circuit 32 from the microprocesor 20 is the page address which was previously utilized by the SCSI DMA control circuit 34 as that page has been completely filled. The microprocessor 20 also initiates the data transfer request on the MUX bus 12 in the same manner any other device initiates a transfer on that bus. Thereafter, when the MUX bus is ready for data, the MUX DMA control 32 cooperates in a manner described above with the buffer 36 to place the content of one addressable storage location within the buffer 36 onto the bus 12. This transfer will occur interleaved with transfers from the SCSI to the buffer 36 until the page being emptied by the MUX bus 12 has been completely transmitted. Then, the MUX DMA control 32 initiates an interrupt to the microprocessor 20 advising it that all the data in the page currently being transmitted has been transmitted and then the MUX DMA control 32 waits for a further command from the microprocessor 20.

As the SCSI bus is slower than the MUX bus, normally the MUX bus will empty the page it is supposed to empty prior to the SCSI bus filling the next page to be emptied. Accordingly, the MUX DMA control 32 will generally have to wait for a further command until a subsequent interrupt occurs from the SCSI DMA control circuit 34 indicates that the next page to be transmitted is now ready. As already noted, when this interrupt occurs, the MUX DMA control 32 is advised to begin transmitting data from the buffer 36 to the MUX bus 12 and the SCSI DMA control circuit 34 is advised to continue receiving data from the SCSI bus 14 and placing it into a different page in the buffer 36. This mode of operation continues until all the data desired to be transmitted has been placed on the next bus.

When a data transmission occurs in the opposite direction, i.e., from the MUX bus 12 to the SCDI bus 14, the MUX DMA control 32 and the SCSI DMA control 34 operate in a slightly different manner. When data is first transmitted by the MUX bus to the buffer, the microprocessor 20 sends control information to the MUX DMA control 32 indicating the page address into which data is first to be transmitted. Thereafter, when the MUX DMA control 32 determines that the page has been filled, it initiates a interrupt to the microprocessor 20. In response thereto, the microprocessor 20 changes the page address of the MUX DMA control 32 to the next available and empty page within the buffer 36 and permits further data transfer from the MUX bus 12 to the buffer 36 into this additional page. The microprocessor 20 also initiates a transfer from the buffer 36 to the SCSI bus 14 by sending control information to the SCSI DMA control circuit 34 indicating the page address of the next page to be transmitted. The SCSI DMA control circuit 34 then causes data to be transmitted from that page in the buffer 36 via the SCSI protocol control 38 to the bus 14. This data transfer will occur until the SCSI DMA control 34 determines that all of the data in that page has been transmitted and then an interrupt is issued to the microprocessor 20.

In response to this interrupt from the SCSI DMA control circuit 34, the microprocessor 20 sends an address to the SCSI DMA control circuit 34 indicating the next page to be transmitted. Thereafter, the SCSI DMA control 34 controls the transfer of the data from the next page in the buffer 36 to the SCSI bus 14.

Asynchronous to the interrupts of the SCSI DMA control 34 are interrupts from the MUX control 32 because the MUX bus is faster than the SCSI bus. As a result, each time an interrupt is received from the MUX DMA control 32 by the microprocessor 20, the microprocessor has to determine whether there is an available page in the buffer 36 for receiving further data from the MUX bus 12. If such a page is available, then the microprocessor 20 sends the page address to the MUX DMA control 32 permitting it to continue the transfer of data from the MUX bus to the buffer 36. In the event that the buffer 36 is filled, however, the microprocessor 20 discontinues further operation of the MUX DMA control 32 until such time as an interrupt is received from the SCSI DMA control circuit 34 indicating that a page is now available and can be filled. Data transfer continues in this manner until such time as all the data has been transmitted from the MUX bus to the SCSI bus.

The following program in the C programming language implements the above described functions in conjunction with the hardware described above.

```
#include "config.h"
#include "types.h"
#include "machine.h"
#include "macros.h"
#include "g_structs.h"
#include "e_structs.h"
#include "scsihpro.h"

unsigned short          input_dma;       /* which dma for input? */
        struct exec_dcb         *dma_dcb;        /* scsidma dcb pointer */

DmaSet(whichway)

DIRECTION       whichway;                /* READ or WRITE */

/* This routine is called from ScsiXfer and initializes requests
 * to xfer data using the dma engines.
 * It sets up the dma control block chain headers and fires off the
 * first block to the input dma. The DmaProc routine will handle the
 * transfer after that.
 */
{
#define LAST_DSEG       16              /* number of 512 dma segments */

/* dma access control blocks */
        static struct dma_acb           d_acb[LAST_DSEG]=
                {0,0x000,0x0ff,1,0,0,0x0100,0x0ff,2,0,0,0x0200,0x0ff,3,0,
                 0,0x030,0x0ff,4,0,0,0x0400,0x0ff,5,0,0,0x0500,0x0ff,6,0,
                 0,0x0600,0x0ff,7,0,0,0x0700,0x0ff,8,0,0,0x0800,0x0ff,9,0,
                 0,0x0900,0x0ff,10,0,0,0x0a00,0x0ff,11,0,0,0x0b00,0x0ff,12,0,
                 0,0x0c00,0x0ff,13,0,0,0x0d00,0x0ff,14,0,0,0x0e00,0x0ff,15,0,
                 0,0x0f00,0x0ff,16,0};

register struct dma_h           *dma_op= &dma_out,
                                        *dma_ip= &dma_in;
        register struct sacb            *scsi_cbp= &scsi_cb;
        register struct exec_dcb        *dma_dcbp;
        register struct dma_h           *dma_frp;

/* setup dma_free chain -- d_acb[ ] gets connected to dma_in */
        dma_frp = &dma_free;
        dma_frp->dh_top = &d_acb[1];
        dma_frp->dh_bot = &d_acb[15];
        dma_frp->dh_cblks= 0;
        dma_frp->dh_flg =    ;
```

```
    switch (whichway) {
    case READ :
        input_dma = SCSI_DMA;

/* let hardware know which direction to go */
        mux_addr->m_buffdir=1;

/* setup scsi dma chip first */
        si_addr->si_load=dma_ip->dh_top->d_sad;
        if(dma_ip->dh_nblks)    /* any full segments ?? */
            si_addr->si_ldwc=dma_ip->dh_top->d_ead;
        else{
            si_addr->si_ldwc=dma_ip->dh_partl;
            dma_ip->dh_flg |= DMA_LAST;
        }
        si_addr->si_enct=1;

break;
    case WRITE :
        input_dma = PMUX_DMA;

/* let hardware know which direction to go */
        mux_addr->m_buffdir=0;

/* set up pmux dma chip first */
        mi_addr->mi_load=dma_ip->dh_top->d_sad;

if(dma_ip->dh_nblks)    /* any full segments ?? */
            mi_addr->mi_ldwc=dma_ip->dh_top->d_ead;
        else{
            dma_ip->dh_flg |= DMA_LAST;
            mi_addr->mi_ldwc=dma_ip->dh_partl;
        }
        mi_addr->mi_enct=1;

/* reset device BUSY to let selch have at it */
        *dma_dcbp->ex.i_muxstat = 0;

break;
    }

/*
#ifndef DBUG
        dma_frp->dh_toutid = 0;
        (timeout(ipc.imatcut,SCSIH_LEVEL,DMA_TOUT,dma_ip->dh_toutid);
#endif
*/ scsi_addr->sc_xfr1=dma_dcbp->ex.i_xfreq[0];
    scsi_addr->sc_xfr2=dma_dcbp->ex.i_xfreq[1];
    scsi_addr->sc_xfr3=dma_dcbp->ex.i_xfreq[2];
    scsi_addr->sc_cmd = DMA_MODE | TRANS_INFO ;

/* Now wait for DmaProc to do the rest of the job. Any signal for
dma xfer will now be processed by the DmaProc routine. */
    return ();
    unsigned char       dma_side;       /* interrupting dma engine */
    long                toutid;         /* timeout flag */

/*  This routine drives the Am2940 dma engines. It is set up
 *  by the DmaSet routine. The dma_acb blocks are taken from the dma_free
 *  chain before firing the input dma engine. This active dma_acb is pointed
 *  to by the dma_in block. The dma_acb for the filled buffer is pushed on the
 *  dma_out chain. It will will be processed from here on output dma engine
 *  exceptions. On an output dma engine exception, the emptied dma_acb will
 *  be pushed on the dma_free list and a new dma_acb will be taken from the
 *  top of the dma_out chain. A detection of parity error or bus phase
 *  change will abnormally terminate the dma transfer.
 */

{
```

```
    register struct dma_h          *dma_frp= &dma_free,
                                   *dma_op= &dma_out,
                                   *dma_ip= &dma_in;
    register struct sacb           *scsi_cbp= &scsi_cb;
    register struct exec_tcb       *dma_tcbp=dma_tcb;

switch (dma_side) { case SCSI_DMA :

if(input_dma == SCSI_DMA) {
           scsi_cbp->s_wptrs.dataptr++;

/* check for bus parity error
              note: NCR chip will have already asserted atn for
              message out phase */
           if(scsi_adir->sc_auxstat & PE) {
               dma_frp->dh_flg |=(DMA_PARITY_ERR|DMA_BLK_HOLE);
               ErrXit(PARITY_ERR,dma_dcbp);
           }

/* if in Bit-Bucket mode, just read data until the
              message-out phase happens or we've caught up on
              recovery */
           if(dma_frp->dh_flg & DMA_BLK_HOLE) {
               DmaBitBucket ();
               break;
           }

/* is the output dma engine active ? */
           if(dma_op->dh_top) { /* yes, just queue this one */
               dma_op->dh_bot->1_fptr=dma_ip->dh_top;
               dma_op->dh_bot=dma_ip->dh_top;
               dma_op->dh_bot->1_fptr=0;
           }else{          /* no, we've got to fire it up !! */
    /* waiting for full segment? */
    if(dma_op->dh_cblks < dma_op->dh_nblks){
        dma_op->dh_top=dma_op->dh_bot=dma_ip->dh_top;
        dma_op->dh_bot->d_fptr=0;

mi_addr->mi_load=dma_op->dh_top->d_sai;
        mi_addr->mi_ldwc=dma_op->dh_top->d_eai;
        mi_addr->mi_enct = 1;

*dma_dcbp->ex.i_auxstat=0;
    }else{
        /* no, must be partial segment! */
        dma_op->dh_top=dma_op->dh_bot=dma_ip->dh_top;
        dma_op->dh_bot->d_fptr=0;

mi_addr->mi_load=dma_op->dh_top->d_sai;
        mi_addr->mi_ldwc= dma_op->dh_partl;
        mi_addr->mi_enct = 1;

*dma_dcbp->ex.i_auxstat=0;
    }

* was this last block for input side? */
i(!(dma_ip->dh_flg & DMA_LAST)){
    /* no, set up for next block */
    ++dma_ip->dh_cblks;
    if(dma_frp->dh_top){  /* any spares available? */
            /* yes, any full segments to go? */
            if(dma_ip->dh_cblks < dma_ip->dh_nblks){
                dma_ip->dh_top=dma_frp->dh_top;
                dma_frp->dh_top=dma_frp->dh_top->1_fptr;

si_addr->si_load=dma_ip->dh_top->1_sad;
                si_addr->si_ldwc=dma_ip->dh_top->1_ead;
```

```
                si_addr->si_enct = 1;
        }else{
            /* no, any partial segments to go? */
            if(dma_ip->dh_partl){
                dma_ip->dh_flg |= DMA_LAST;
                dma_ip->dh_top=dma_frp->dh_top;
                dma_frp->dh_top=dma_frp->dh_top->d_fptr;

si_addr->si_load=dma_ip->dh_top->d_sad;
                si_addr->si_ldwc= dma_ip->dh_partl;
                si_addr->si_enct=1;
            }else
                dma_ip->dh_flg |= DMA_DONE;
        }
    }else
            /* no spares, wait for output to free one up */
            dma_ip->dh_top=0;
    }else
        /* we're done with input!! */
        dma_ip->dh_flg |= DMA_DONE;

}else{  /* ********SCSI is on output ******** */ scsi_cbp->s_wptrs.dataptr++;
    /* is input dma still active? */
    if((!(dma_ip->dh_flg & DMA_DONE))){
        /* yes, waiting for this dma_acb? */
        if(dma_ip->dh_top)
            /* no, return this one to free list */
            if(dma_frp->dh_top) {
                dma_frp->dh_bot->d_fptr=dma_op->dh_top;
                dma_frp->dh_bot=dma_op->dh_top;
                dma_op->dh_top = dma_op->dh_top->d_fptr;
                dma_frp->dh_bot->d_fptr=0;
            }else{
                dma_frp->dh_top=dma_frp->dh_bot= dma_op->dh_top;
                dma_op->dh_top = dma_op->dh_top->d_fptr;
                dma_frp->dh_top->d_fptr=0;
            }
        else{
            /* yes, fire it up !! */

/* any full segments to go? */
            if(dma_ip->dh_cblks < dma_ip->dh_nblks){
                dma_ip->dh_top=dma_op->dh_top;
                dma_op->dh_top = dma_op->dh_top->d_fptr;
                mi_addr->mi_load=dma_ip->dh_top->d_sad;
                mi_addr->mi_ldwc=dma_ip->dh_top->d_ead;
                mi_addr->mi_enct=1;
                /* reset auxstat busy */
                *dma_dcbp->ex.i_auxstat=0;
            }else{
                if(dma_ip->dh_partl){
                    dma_ip->dh_flg |= DMA_LAST;
                    dma_ip->dh_top=dma_op->dh_top;
                    dma_op->dh_top = dma_op->dh_top->d_fptr;
                    mi_addr->mi_load=dma_ip->dh_top->d_sad;
                    mi_addr->mi_ldwc= dma_ip->dh_partl;
                    mi_addr->mi_enct = 1;
                    /* reset auxstat busy */
                    *dma_dcbp->ex.i_auxstat=0;
                }else{
                    dma_op->dh_top = dma_op->dh_top->d_fptr;
                    dma_ip->dh_flg |= DMA_DONE;
                    /* note: status already set by paux side
                }
            }
        }
    }else
```

```
                    dma_op->ih_top = ima_op->ih_top->d_fptr;

++dma_op->ih_cblks;
        /* any ready to go on output queue? */
        if(dma_op->dh_top){
                /* yes, process full segment? */
                if(dma_op->dh_cblks < ima_op->dh_nblks){
                        si_addr->si_load=dma_op->ih_top->d_sad;
                        si_addr->si_ldwc=dma_op->dh_top->d_ead;
                        si_addr->si_enct = 1;

}else{
                        /* no, must be partial segment */
                        si_addr->si_load=dma_op->dh_top->d_sad;
                        si_addr->si_ldwc= dma_op->dh_partl;
                        si_addr->si_enct=1;

}
        }else
            /* check if input side really done */
            if(ima_ip->dh_flg & DMA_DONE){
                    /* yes, then we're done!! */
                    dma_dcbp->ex.i_flgs &= ~(FLG_DMA|FLG_DAC);
            }

}
    break;

case PMUX_DMA :

if(input_dma == PMUX_DMA) {

/* is the output dma engine active ? */
        if(dma_op->dh_top) { /* yes, just queue this one */
            dma_op->dh_bot->i_fptr=dma_ip->dh_top;
            dma_op->dh_bot=dma_ip->dh_top;
            dma_op->dh_bot->i_fptr=0;
        }else{          /* no, we've got to fire it up !! */
            /* any full segments to go? */
            if(dma_op->dh_cblks < dma_op->dh_nblks){
                    dma_op->ih_top=dma_op->dh_bot=dma_ip->dh_top;
                    dma_op->ih_top->d_fptr=0;

si_addr->si_load=dma_op->dh_top->d_sad;
                    si_addr->si_ldwc=dma_op->dh_top->d_ead;
                    si_addr->si_enct = 1;

}else{
                    /* no, must be partial segment */
                    dma_op->ih_top=dma_op->dh_bot=dma_ip->dh_top;
/*      types.h      program      */
```

```
typedef int (*FUNC_ADDR)() ;

typedef short    PROCESS_ID           ;
typedef short    FAULT_ID             ;
typedef unsigned TIME                 ;
typedef short    LEVEL                ;
#define INFIFC 16                     /* number of halfwords */
define OUTFIFC 16                    /* number of halfwords */ typedef short   BLOCKING_CONDITIONS   ;
define         START_UP              0x0001
#define         TERMINATION           0x0002
#define         WAIT_ON_SIGNAL        0x0004
#define         SUSPEND               0x0008
```

```
#define         USER_BLOCK_12           0x0010
#define         USER_BLOCK_11           0x0020
#define         USER_BLOCK_10           0x0040
#define         USER_BLOCK_9            0x0080
#define         USER_BLOCK_8            0x0100
#define         USER_BLOCK_7            0x0200
#define         USER_BLOCK_6            0x0400
#define         USER_BLOCK_5            0x0800
#define         USER_BLOCK_4            0x1000
#define         USER_BLOCK_3            0x2000
#define         USER_BLOCK_2            0x4000
define         USER_BLOCK_1            0x8000 define PROCESS_STATE   char
define         NULL_PROCESS            0
#define         BLOCKED                 1
#define         READY                   2
#define         INSTALLED_BLOCKED       3
#define         INSTALLED_READY         4
#define         INSTALLED_ACTIVE        5
define         FAULT                   6 typedef struct ex_state EXECUTION_STATE ;

/* bits defined in the ps */
#define         CARRY                   0x0001
#define         OVERFLOW                0x0002
#define         ZERO                    0x0004
#define         NEGATIVE                0x0008
#define         EXTEND                  0x0010
    /*      types.h    (cont)     */

/*
 * possible error conditions */
#define KHARD                   0x0200
#define DHARD                   0x0400
#define FAULT_MASK              0xfC00
#define NON_FATAL               0
#define FATAL                   0x8000
#define CATASTROPHIC            0xfC00

/* software generated exceptions */ define INVALID_ID              0x8001  /* 1+FATAL        */
define PARAMETER_RANGE_ERROR   0x8002  /* 2+FATAL        */
#define OBJECT_IN_USE           0x0003  /* 3+NON_FATAL */
#define QUEUE_OVERFLOW          0x0004  /* 4+NON_FATAL */
#define NO_SIGNAL_QUEUE         0x0005  /* 5+NON_FATAL */

/* hardware generated exceptions */ define POWER_FAIL              0xffC1          /* KHARD+1+CATASTROPHIC */
define KBUS_ERROR              0xffC2          /* KHARD+2+CATASTROPHIC */
#define DBUS_ERROR              0xfdC2          /* DHARD+2+CATASTROPHIC */
#define KADDRESS_ERROR          0xffC3          /* KHARD+3+CATASTROPHIC */
#define DADDRESS_ERROR          0xfdC3          /* DHARD+3+CATASTROPHIC */
#define KILLEGAL_INSTRUCTION    0xCfC4          /* KHARD+4+NON_FATAL */
#define DILLEGAL_INSTRUCTION    0xCdC4          /* DHARD+4+NON_FATAL */
#define KZERO_DIVIDE            0xCfC5          /* KHARD+5+NON_FATAL */
#define DZERO_DIVIDE            0xCdC5          /* DHARD+5+NON_FATAL */
#define KCHK_INSTRUCTION        0xCfC6          /* KHARD+6+NON_FATAL */
#define DCHK_INSTRUCTION        0xCdC6          /* DHARD+6+NON_FATAL */
#define KTRAPV_INSTRUCTION      0xCfC7          /* KHARD+7+NON_FATAL */
#define DTRAPV_INSTRUCTION      0xCdC7          /* DHARD+7+NON_FATAL */
#define KPRIVILEGE_VIOLATION    0xefC8          /* KHARD+8+FATAL */
#define DPRIVILEGE_VIOLATION    0xedC8          /* DHARD+8+FATAL */
#define KTRACE                  0xCfC9          /* KHARD+9+NON_FATAL */
#define DTRACE                  0xCdC9          /* DHARD+9+NON_FATAL */
#define KUNINITIALIZED_VECTOR   0xffCf          /* KHARD+15+CATASTROPHIC */
#define DUNINITIALIZED_VECTOR   0xfdCf          /* DHARD+15+CATASTROPHIC */
```

```
#define KSPURICUS_INTERRUPT     0xCf18      /* KHARD+24+NON_FATAL */
#define DSPURICUS_INTERRUPT     0xCd18      /* DHARD+24+NON_FATAL */
#define KPARITY_ERROR           0xff42      /* KHARD+66+CATASTROPHIC */
#define DPARITY_ERROR           0xfd42      /* DHARD+66+CATASTROPHIC */
#define DFIFO_OVERFLOW          0xCd8C      /* DHARD+128+NON_FATAL */
#define DFIFO_EMPTY             0xCdE1      /* DHARD+129+NON_FATAL */

/* IPC HANDLER commands */ define CBL_IN      1           /* steering code for command blk*/
define RACK        0x800       /* rack generated interrupt      */
#define FIFO_OVER   3           /* fifo overflow fault           */
    /*      types.h     (cont)    */

/* SYSTEM CRASH CODE   */ define SHUTDOWN            0x2700
define FAULT_STOP          0x27C1
#define BUS_ERROR_STOP      0x27C2
#define ACCESS_ERROR_STOP   0x2703
#define UNINIT_STOP         0x27C4
#define PARITY_ERROR_STOP   0x27C5
#define STACK_OVERFLOW      0x27C6

/*      config.h    program    */

/* user defined configuration statements */ define ACCING          0           /* oc accounting                */
define MAXSIG          20          /* size of the signal queue     */
#define MAXLEVEL        32          /* number of interrupt levels   */
#define MAXPID          32          /* number of process ids        */
#define PIDMASK         0xff        /* use to mask in pidindex      */
#define MAXTIMEOUT      32          /* number of outstanding timeout*/
#define MAXCMD          32          /* number of command buffers    */
#define MAXSTACK        256         /* slots in process stack       */
#define DIAGSTK         0x30000     /* diag. stack                  */
#define TPDGSTK         0x2d000     /* top of diagnostic stack      */
#define NBUFS           12          /* number of command buffers    */
#define BUFSIZE         32          /* size each cmd buffer in h.w. */
#define NDISKS          4           /* number of supported disks    */
#define NTAPES          2           /* number of supported tapes    */
#define SPARE_CCBS      2           /* spare entries                */
#define MAX_CCBS        NDISKS+NTAPES+SPARE_CCBS
define DSEG_SIZE       512         /* DEA segment size             */ define SCSIH_LEVEL     30          /* level for scsi handler       */
define MUXIO_LEVEL     29          /* level for mux io handler     */
#define IPCE_LEVEL      28          /* level for ipc executive      */
#define IPCH_LEVEL      27          /* level for ipc handler        */
#define DISKIO_LEVEL    25          /* level for disk io handler    */
#define TAPEIO_LEVEL    24          /* level for tape io handler    */
#define DISKCMD_LEVEL   23          /* level for disk cmd handler   */
#define TAPECMD_LEVEL   22          /* level for tape cmd handler   */
#define DISKTERM_LEVEL  21          /* level for disk termination   */
#define TAPETERM_LEVEL  20          /* level for tape termination   */
#define DISKINIT_LEVEL  19          /* level for disk initialization*/
#define TAPEINIT_LEVEL  18          /* level for tape initialization*/
#define IDLEP_LEVEL     17          /* level for the idle process   */
                                    /*  (firmware rev to lights )   */
/*      macros.h    program    */
#define PIDINDEX(x)                 (x&conf.pidmask)
```

```
#define UNINTERRUPTABLE    splhi()
#define INTERRUPTABLE      splx()

/* for the functions splhi, splx and resched_intr,
   inline insertion of assembler instructions are intended
*/ splhi:                              | cr - register int x
        movw    sr,sp@-             | save previous status register
        movw    #HI_MSK,sr          | move high mask into SR splx:                               | cr - register int x
        movw    sp@+,sr             | restore status register /* EXCEPTION can only be called from the highest level kernel
   service routine. It makes an assumption as to the number
   of stack frames to unwind                                    */ define EXCEPTION(x)        exception(x)
```

```
/*      machine.h       program      */
typedef char    REG8    ;       /* 8 bit register */
typedef short   REG16   ;       /* 16 bit register*/
typedef long    REG32   ;       /* 32 bit register*/ extern unsigned long    *dma_ram;       /* dma start address */
extern struct vector    vector ;        /* start of exception tab */ struct scsi_regs        {
    /* 00 */    REG16   sc_data;
    /* 02 */    REG16   sc_cmd;
    /* 04 */    REG16   sc_cntrl;
    /* 06 */    REG16   sc_destid;
    /* 08 */    REG16   sc_auxstat;
    /* 0A */    REG16   sc_id;
    /* 0C */    REG16   sc_intr;
    /* 0E */    REG16   sc_srcid;
    /* 10 */    REG16   sc_pad1;
    /* 12 */    REG16   sc_diagstat;
    /* 14 */    REG16   sc_pad2[2];
    /* 18 */    REG16   sc_xfr1;
    /* 1A */    REG16   sc_xfr2;
    /* 1C */    REG16   sc_xfr3;
    /* 1E */    REG16   sc_reserved;
};

extern struct scsi_regs *scsi_addr ;
/*      machine.h       (cont)       */
struct aux_regs {
    /* 00 */    REG16   a_out;
    /* 02 */    REG16   a_in;
    /* 04 */    REG16   a_cmd0;
    /* 06 */    REG16   a_stat0;
    /* 08 */    REG16   a_lights;
    /* 0A */    REG16   a_setatn0;
    /* 0C */    REG16   a_curaddr;
    /* 0E */    REG16   a_rstbsy;
    /* 10 */    REG16   a_rdcnt;
    /* 12 */    REG16   a_centcnt;
    /* 14 */    REG16   a_cmd1;
    /* 16 */    REG16   a_stat1;
```

```
/* 18 */    REG16    m_stpcnt;
/* 1A */    REG16    m_fint;
/* 1C */    REG16    m_clrint;
/* 1E */    REG16    m_intadr;
/* 2C */    REG16    m_buffdir;
/* 22 */    REG16    m_valaddr;
/* 24 */    REG16    m_cmd2;
/* 26 */    REG16    m_stat2;
/* 28 */    REG16    m_cmdpend;
/* 2A */    REG16    m_rstout;
/* 2C */    REG16    m_hcwmany;
/* 2E */    REG16    m_rstclk;
/* 30 */    REG16    m_pad2[2];
/* 34 */    REG16    m_cmd3;
/* 36 */    REG16    m_stat3;
/* 38 */    REG16    m_pad3[6];
/* 34 */    REG16    m_cmd4;
/* 36 */    REG16    m_stat4;
/* 38 */    REG16    m_pad4[6];
/* 44 */    REG16    m_cmd5;
/* 46 */    REG16    m_stat5;
/* 48 */    REG16    m_pad5[6];
/* 54 */    REG16    m_cmd6;
/* 56 */    REG16    m_stat6;
/* 58 */    REG16    m_pad6[6];
/* 64 */    REG16    m_cmd7;
/* 66 */    REG16    m_stat7;
/* 68 */    REG16    m_pad7[6];
/* 74 */    REG16    m_cmd8;
/* 76 */    REG16    m_stat8;
/*    machine.h    (cont)    */
extern struct mux_regs *mux_addr ;

/* the following is included for the sake of interrupt.s */ define MUX_ADDR    0x05C000
define M_OUT       0x0CC0
#define M_IN        0x0CC2
#define M_CMD0      0x0CC4
#define M_STAT0     0x0CC6
#define M_LIGHTS    0x0CC8
#define M_SITATNC   0x0CCA
#define M_EASADDR   0x0CCC
#define M_RSTPSY    0x0CCE
#define M_BTCNT     0x0CC1C
#define M_CCNTCNT   0x0CC12
#define M_CMD1      0x0CC14
#define M_STAT1     0x0CC16
#define M_WHTRACK   0x0CC18
#define M_FINT      0x0CC1A
#define M_CLRINT    0x0CC1C
#define M_INTADR    0x0CC1E
#define M_BUFFDIR   0x0CC20
#define M_VALADDR   0x0CC22
#define M_CMD2      0x0CC24
#define M_STAT2     0x0CC26
#define M_CMDPEND   0x0CC28
#define M_RSTOUT    0x0CC2A
#define M_HCWMANY   0x0CC2C
#define M_RSTCLK    0x0CC2E
#define M_CMD3      0x0CC34
#define M_STAT3     0x0CC36
#define M_CMD4      0x0CC34
#define M_STAT4     0x0CC36
#define M_CMD5      0x0CC44
#define M_STAT5     0x0CC46
#define M_CMD6      0x0CC54
#define M_STAT6     0x0CC56
#define M_CMD7      0x0CC64
```

```
#define M_STAT7      0xCC66
#define M_CMD8       0x0C74
#define M_STAT8      0x0C76
#define RACKG_CAME      0x00C1
#define RACKG_CAME_B    0xC0CC
#define RESCPCKE        0x00C4
define RESCPCKE_B      0xCC02 define SCSI_ADDR  0x4CCC0
define SC_AUXSTAT 0x0CC8
define SC_INTR    0x0CCC define SC_DMA       0x6CC0C
define SC_DMA_REIN  0xC008
#define SC_DMA_LCAD  0xC00A
define SC_DMA_LDWC  0xC0CC define PM_DMA       0x70CC0
define PM_DMA_REIN  0xCC08
#define PM_DMA_LCAD  0xC00A
#define PM_DMA_LDWC  0xCC0C
/*      machine.h     (cont)      */
#define LVL1DF  0xdd82         | diagnostic faults on interrupts
#define LVL2DF  0xdd83
#define LVL3DF  0xdd84
#define LVL4DF  0xdd85
#define LVL5DF  0xdd86
#define LVL6DF  0xdd87
define LVL7DF  0xdd89 struct  si_intf {
        REG16   si_wrcr;
        REG16   si_rdcr;
        REG16   si_rdwc;
        REG16   si_rdac;
        REG16   si_rein;
        REG16   si_load;
        REG16   si_ldwc;
        REG16   si_enct;
};

extern struct si_intf *si_addr;

struct  mi_intf {
        REG16   mi_wrcr;
        REG16   mi_rdcr;
        REG16   mi_rdwc;
        REG16   mi_rdac;
        REG16   mi_rein;
        REG16   mi_lcad;
        REG16   mi_ldwc;
        REG16   mi_enct;
};

extern struct mi_intf *mi_addr;
/*      q_structs.h     program     */
/* general literals */
#define RAM_STRT    0xC10C0C
define RAM_END     0xC030C0C /* IpcTerm phase termination request flags */
define DONE        0x00C1   /* sets status and DVR_IDLE */
#define EXIT        0x00C2   /* sets status only */
#define XST_DONE    0x00C3   /* error xit on ext. status */
/*
CFIFO_RQST      0x0020    output fifo request
IFIFO_RQST      0x0040    input fifo request
IFIFO_REL       0x1000    IFIFO release request and DONE
CFIFO_REL       0x2000    CFIFO release request and DONE
```

```
/* driver signal codes */
#define CMD_RQST         0x00     /* command request */
#define MSG_ABORT        0x06     /* abort message */
#define MSG_RESET        0x0c     /* bus device reset message */
#define SCSI_DONE        0xC7     /* scsi request complete */
#define OPR_CAN          0xC8     /* scsi operation cancel request */
#define DMA_START        0xCa     /* dma xfer has been started */
#define CMD_GEN          0xCb     /* generic command request */

/* p-e command requests */
#define BUS_RESET        0x081
#define XFER_TOUT        0x082
#define DOWN_DATA        0x090
#define PASS_THRU        0x091
#define UP_LOAD          0x092
#define DOWN_LOAD        0x093
#define CCPMAND          0x094
#define IMAGE_CPY        0x095
#define DIAGNOSTIC       0x09e
#define FCRMAT           0x09f
     /*     g_structs.h     (cont)     */

/* scsi command codes */
/* group C0 */
#define TST_UNIT_RDY     0x000
#define REZERO_UNIT      0x001
#define REWIND           0x001
#define RETNSN           0x002
#define REQ_SENSE        0x003
#define FORMAT_UNIT      0x004
#define SET_RDWR         0x006
#define RD_BLK_LIMIT     0x005
#define ASN_ALT_BLK      0x007
#define READ             0x008
#define WRITE            0x00a
#define SEEK             0x00b
#define WR_FM            0x010
#define SPACE            0x011
#define INQUIRY          0x012
#define VERIFY           0x013
#define RCV_BUF          0x014
#define MODE_SEL         0x015
#define RESRV_UNIT       0x016
#define REL_UNIT         0x017
#define COPY             0x018
#define ERASE            0x019
#define MODE_SENSE       0x01a
#define START_STOP       0x01b
define CMD_BUF          0x01c /* group C1 */
define RD_CAPACITY      0x025
#define LREAD            0x028
#define LWRITE           0x02a
#define WR_VER           0x02e
#define LVERIFY          0x02f
#define S_D_HIGH         0x030
#define S_D_EQ           0x031
define S_D_LOW          0x032 define SIGNAL_CODE      short              /* parm1 on KSEND call */

/*
 * defines for auxioproc signals
 */
#define GET_ATNO         0xC008   /* setatn0 request */
#define CAN_ATNO         0xC010   /* cancel setatn0 request */
```

```
#define OFIFO_RQST      0x0020    /* output fifo request */
#define IFIFO_RQST      0x0040    /* input fifo request */
#define IFIFO_TOUT      0x0080    /* IFIFO timeout has occurred */
#define OFIFO_TOUT      0x0100    /* OFIFO timeout has occurred */
#define OF_EMPTY        0x0200    /* OFIFO empty */
#define FIFO_OVFL       0x0400    /* IFIFO overflow */
#define IFIFO_REI       0x1000    /* IFIFO release request */
#define OFIFO_REI       0x2000    /* OFIFO release request */
#define IFIFO_CON       0x4000    /* IFIFO resource connect */
#define OFIFO_CON       0x8000    /* OFIFO resource connect */
/*       g_structs.h   (cont)     */
/* define aux status register masks */
#define DU      0x0001
#define IPC_F   0x0002
#define FXA     0x0004
#define BSY     0x0008
#define FIFO_C  0x0010
#define RDY_XFR 0x0020
#define SEQ_ERR 0x0040
#define DEV_ERR 0x0080

/* define command register masks */
#define CMD_DSR 0x0C0    /* disarm request */
#define CMD_DIS 0x080    /* disable interrupts */
#define CMD_ENA 0x040    /* enable interrupts */
#define CMD_TST 0x020    /* test */
#define CMD_RST 0x010    /* reset */
#define CMD_GO  0x008    /* go */
#define CMD_HLT 0x004    /* halt */
#define CMD_XST 0x002    /* extended status request */
#define CMD_CMD 0x001    /* command block */
#define CMD_NUL 0x000    /* no command bits */

/* define system crash code masks */
#define CRSHCC1         0x0001    /* Kcmdget in ipceproc failed */
#define CRSHCC2         0x0002
#define CRSHCC3         0x0003
#define CRSHCC4         0x0004    /* unidentified signal received */
#define CRSHCC5         0x0005
#define CRSHCC6         0x0006
#define CRSHCC7         0x0007    /* invalid scsi command sequence */
#define CRSHCC8         0x0008    /* srb locked with status request pending */
#define CRSHCC9         0x0009    /* unexpected bus phase */

/* define crash module numbers */
#define IPCEPROC        0x010     /* ipceproc */
#define IPCTERM         0x011
#define MUXIOPRO        0x020     /* muxicpro */
#define SETSTATUS       0x021
#define IPCHPROC        0x030     /* ipchproc */
#define IPCINIT         0x031
#define IPCCMDA         0x032
#define CODE81A         0x033
#define CODE91A         0x034
#define CODE91B         0x035
#define CODE93          0x036
#define DINITPROC       0x040     /* disk driver */
#define DICMDSUB        0x041
#define DCMDPCC         0x042
#define DCGCC           0x043
#define DCXSTATA        0x044
#define DIOPPCC         0x045
#define DTXST           0x046
#define DICRQST         0x047
#define TCPIPROC        0x050     /* tape driver */
#define TXSTATA         0x051
#define TICPKCC         0x052
#define TICRSTA         0x053
#define TICMDSUB        0x054
#define TICRQST         0x055
```

```c
#define TICROSTA         0x056
#define TINITFRCC        0x057
#define SCSIHFPCC        0x060   /* scsi handler */
#define SCSICMD1         0x061
        /*      g_structs.h    (cont)       */
```

```c
/* error logger codes */
define BUS_XCEPTION     0x0001 define NIL                      /* null pointer */

/* system error codes (dcb.i_errcode) */
#define ERR_DBSY         0x021   /* device busy */
#define ERR_IFTOUT       0x022   /* input fifo timeout */
#define ERR_OFTOUT       0x023   /* output fifo timeout */
#define ERR_IFOVFL       0x024   /* input fifo overflow */
#define ERR_CMD          0x025   /* command out of sequence for state */
#define ERR_CMDERR       0x026   /* formatter detected error */
#define ERR_DISCONNECT   0x027   /* scsi disconnect occurred unexpectedly */
#define ERR_CMDSEQ       0x028   /* scsi command error detected */
#define ERR_BUFLIM       0x029   /* download data buffer full */
#define ERR_MSGI         0x030   /* scsi bus parity error during msg-in phase */
#define ERR_MSGO         0x031   /* scsi bus parity error during msg-out phase */
#define ERR_DTA          0x032   /* scsi bus parity error during data phase */
#define ERR_OVFL         0x033   /* data buffer overflow on scsi */
#define ERR_DCHECK       0x034   /* check condition in return status byte */
#define ERR_FIFCICK      0x035   /* on-going fifo activity detected */
#define ERR_TOUTS        0x036   /* timeout on selection */
#define ERR_PHASE        0x037   /* unexpected scsi bus phase or interrupt */
#define ERR_DMATOUT      0x038   /* dma timeout occurred */
#define ERR_DTYPE        0x039   /* device type code error */
#define ERR_UION         0x040   /* ION not present */
#define ERR_SCSI         0x041   /* unexpected scsi bus phase disconnect */
#define ERR_CNI          0x042   /* cartridge not in place */
#define ERR_WRP          0x043   /* media is write protected */
#define ERR_ECM          0x044   /* end of media */
#define ERR_UDE          0x045   /* unrecoverable data error */
#define ERR_BNL          0x046   /* bad block not located */
#define ERR_FII          0x047   /* filemark detected */
#define ERR_NDT          0x048   /* no data detected */
#define ERR_BOM          0x049   /* beginning of media */
#define ERR_BPE          0x050   /* bus parity error */
#define ERR_NRD          0x051   /* device not ready */
#define ERR_HWE          0x052   /* hardware error */
#define ERR_OAT          0x053   /* unit attention */
#define ERR_BLKSZ        0x054   /* zero block size detected */
#define ERR_ME           0x055   /* media error */

/* dcb.i_type device type codes */
#define TYPE_DAD         0x00    /* direct access device */
#define TYPE_SAD         0x01    /* sequential access device */
#define TYPE_PRT         0x02    /* printer type device */
#define TYPE_CRT         0x03    /* write once, read multiple */
#define TYPE_UNAV        0x7f    /* device type unavailable */

/* SCSI bus activity indicator */
#define N_ACTIVITY       0x01    /* no scsi activity on-going */
define SCSI_ACTIVITY    0x02    /* scsi request issued */ define    DVR_STATES    char    /* defined on-board states */
       /*      g_structs.h    (cont)       */
/*
 * defines for driver states
 */
#define    DVR_IDLE      0x01
#define    DVR_BSY       0x02
#define    DVR_INIT      0x04
#define    DVR_ISR       0x08
#define    DVR_TRP       0x10
```

```c
/* defines for dcb.i_flgs */
#define FLG_DSM 0x8000  /* device mtx stat */
#define FLG_ENA 0x4000
#define FLG_HIT 0x0200  /* halt command received */
#define FLG_RST 0x0100  /* reset command received */
#define FLG_AVL 0x0080  /* scsi device available */
#define FLG_DMA 0x0040  /* dma request */
#define FLG_BMD 0x0020  /* dma byte mode */
#define FLG_DAC 0x0010  /* dma active */
/*              0x0008    scsi bus active */
#define FLG_DLCC 0x0004 /* dma lock flag */
#define FLG_IMG 0x0001  /* flag image copy active */

/*
   INQUIRY returned data blocks
*/
union inq_rdb {

/* disk INQUIRE returned data block */
        struct {
                unsigned char   dinq_type;      /* type code 00 is random */
                unsigned dinq_qb : 1;           /* 0 = fixed ; 1 = removable */
                unsigned dinq_qual : 7;         /* device type qualifier 00*/
                unsigned char   dinq_scsirev;   /* scsi revision level 00 */
                char            ;               /* 00 */
                unsigned char   dinq_len;       /* # of additional bytes 03 */
                unsigned char   dinq_rev;       /* firmware revision level 00 */
                char            ;               /* 00 */
                char            ;               /* 00 */

}dinq;

/* streamer INQUIRE returned data block */
        struct {
                unsigned char   minq_type;      /* type code 01 is sequent. */
                unsigned minq_qb : 1;           /* 0 = fixed ; 1 = removable */
                unsigned minq_qual : 7;         /* device type qualifier 00*/
                unsigned char   minq_scsirev;   /* scsi revision level 00 */
                char            ;
                char    minq_len;               /* # of additional bytes 0b */
                char    minq_ctype;             /* type controller 03 is tape */
                char    minq_contrev;           /* controller firmware level */
                char    minq_devs;              /* number of drives 00 or 01 */
                char    minq_fill[5];
                char    minq_512;               /* 512 data block 01 */
                char    minq_rdy;               /* ready status 01 ready */
                char    minq_media;             /* media type 80 */
        }minq;
};
    /*      g_structs.h     (cont)   */
/*
   REQUEST SENSE rdb
*/
struct rs_rdb {
        unsigned rs_vb : 1;             /* valid bit */
        unsigned       : 7;
        char     rs_f1;
        unsigned rs_f2 : 4;
        unsigned rs_sk : 4;             /* sense key */
        unsigned char  rs_info[20];     /* information bytes */
};

/* defines for request sense sense key */
#define SK_NONE         0x00
#define SK_RECVR        0x01    /* recoverable error */
#define SK_NRDY         0x02    /* not ready */
#define SK_MERR         0x03    /* media error */
#define SK_HERR         0x04    /* hardware error */
#define SK_RQST         0x05    /* illegal request */
#define SK_UATN         0x06    /* unit attention */
#define SK_PRCT         0x07    /* data protect */
```

```c
#define SK_ABORT        0x0b    /* aborted command */
#define SK_EQ           0x0c    /* search data equal */
#define SK_OVFLO        0x0d    /* volume overflow */

/*
 * mcde sense returned data block
 */
union ms_rdb {
        unsigned char   dms_rdb[23];    /* disk rdb */
        unsigned char   sms_rdb[11];    /* streamer rdb */
};

/*
 * assign alternate block command data block
 */
struct a_s {
        unsigned char   pad0 ;
        unsigned char   pad1 ;
        unsigned char   pad2 ;
        unsigned char   size ;
        unsigned char   addr[4] ;
};

/*
 * read capacity returned data block
 */
struct rc_r {
        unsigned char   rc[8] ;
};

/*
 * request control block
 */
struct rcb      {
        int     (*rcb_sub)();           /* current handler pointer */
        int     (*rcb_suba)();          /* alternate handler pointer */
        long    rcb_flgs;               /* handler flags */
           signed char  rcb_slvl;       /* subroutine level */
};
    /*      g_structs.h     (cont)      */

/*
 * FE command block
 */
struct cmd_buf {
        unsigned                : 0;
        unsigned c_cmd          : 8;    /* command byte */
        unsigned                : 1;    /* reserved */
        unsigned c_dev          : 3;    /* scsi formatter id */
        unsigned                : 1;    /* reserved */
        unsigned c_lun          : 3;    /* l.u.n. number */
        unsigned short  c_parms[BUFSIZE-1];     /* command parameters */
};

/*
 * scsi cdb struct
 */
struct cdb {
        unsigned cdb_grp        : 3;    /* group code */
        unsigned cdb_cmd        : 5;    /* command byte */
        unsigned cdb_lun        : 3;    /* l.u.n. number */
        unsigned cdb_res1       : 5;    /* reserved */
        unsigned char   cdb_parms[8];   /* command parameters */
};

/*
 * returned data block from image copy (IBA# error during read)
 */
```

```
struct img_cpy {
        long    ic_pad[25] ;            /* pad for request sense data */
        long    ic_curr ;               /* current device transferring*/
        short   ic_errcode ;            /* return code                */
        short   ic_blks ;               /* number of blocks in ic_lba */
        long    ic_xfer ;               /* number of lba transferred  */
        long    ic_lba[6] ;             /* input error lba #          */
} ;

/*
 returned scsi status block
 */
union rsb {
        struct {
                unsigned                : 0;
                unsigned                : 12;
                unsigned  rs_busy       : 1;    /* l.u.n. is busy */
                unsigned  rs_scm        : 1;    /* search condition set */
                unsigned  rs_check      : 1;    /* check condition */
                unsigned  rs_re         : 1;    /* recoverable error */
        } rsb_bit;
        unsigned short    rsb_valu;
};
        /*      g_structs.h     (cont)  */
/*
 returned data block
 */
union rdb {
        union   inq_rdb  r_i;           /* INQUIRY rdb */
        union   ms_rdb   r_m;           /* MODE SENSE rdb */
        struct  rs_rdb   r_r;           /* REQUEST SENSE rdb */
        struct  a_s      as_sdb;        /* REASSIGN sdb */
        struct  rc_r     rc_rdb;        /* READCAPACITY rdb */
        char             data[512];     /* download data */
        short            msel_rdb[9];   /* MODE_SEL rdb */
        struct  img_cpy  ic_rdb ;       /* IMAGE_COPY rdb */
};

/*
 * Device Independent  dcb
 */
struct   ind_dcb {                      /* device independent part */
        unsigned short  i_flgs;         /* independent flags */
        unsigned short  i_mflgs;        /* auxiopro flags */
        char            *i_xfersad;     /* buffer start addr for non dma */
        char            *i_xferead;     /* buffer end addr for non dma */
        unsigned short  *i_muxstat;     /* pointer to device MUXSTAT */
        struct cmd_buf  *i_cbptr;       /* command buffer pointer */
        union rdb       *i_rdb;         /* returned data block */
        unsigned short  *i_ofdptr;      /* cfifo data pointer */
        unsigned short  i_fccunt;       /* outfifo h.w. count */
        long            i_xfercnt;      /* xfer counter (bytes/blocks) */
        long            i_blksz;        /* device block size */
        long            i_nblks;        /* number of blocks on media */
        long            i_blkcnt;       /* # segments xferd on selch (dma) */
        long            i_inblks;       /* # input dma segments */
        long            i_outblks;      /* # output dma segments */
        unsigned short  i_irblk;        /* # h.w. on input partial block */
        unsigned short  i_oblk;         /* # h.w. on output partial block */
        unsigned char   i_xfreg[3];     /* scsi xfer counter save */
        unsigned short  i_stat;         /* device MUXSTAT value */
        LEVEL           i_clvl;         /* current handler level */
        LEVEL           i_ilvl;         /* sysinit handler level */
        unsigned short  i_dn;           /* device address */
        DVR_STATES      i_state;        /* current driver state */
        unsigned char   i_scsi;         /* scsi formater # */
        unsigned char   i_lun;          /* l.u.n */
        unsigned char   i_smsg;         /* requested scsi msg save */
        struct rcb      i_rcb;          /* request control block */
        unsigned char   i_type;         /* scsi device type */
```

```
              struct cdb        i_cdb;              /* scsi cdb */
              /* note: the next three fields must be contiguous */
              unsigned short    i_errcode;          /* error code */
              union rsb         i_rsb;              /* returned scsi status byte */
              union rdb         i_rdbsave;          /* returned data block */
      };
      /*      g_structs.h       (cont)     */

/*
       * streamer control struct
       */
      struct mag_dcb {
              int       mag_flgs;     /* device dependent flags */
              short     mag_icntr;    /* tinitproc scratch */
      };

/* tape dependent flag masks */
      #define TFLG_MSEL         0x00000001          /* mode select required */
      #define TFLG_SRW          0x00000002          /* set rd/wrt required */
      #define TFLG_EM           0x00000004          /* in ext. streaming mode */
      #define TFLG_BM           0x00000008          /* in buffered mode */

/*
       * winchester control struct
       */
      struct disk_dcb {
              int       disk_flgs;    /* device dependent flags */
              short     disk_icntr;   /* dinitproc scratch */
      };

/*
       * device control block
       */
      struct dcb {
              struct    ind_dcb    dcb_i;           /* device indep. part */
              union {
                      struct    disk_dcb    d;
                      struct    mag_dcb     t;
              }dcb_d ;                              /* device dependent part */
      };

/*
       * ipc global system control table
       */
      struct ipc_ctbl {
              unsigned char     up;                 /* system up flag */
              long              dmatout;            /* dma timeout in mils */
              unsigned char     errlogr;            /* error logger/retry flags */
              unsigned short    cflag;              /* general control flags */
              unsigned char     revision[24];       /* IPC revision stamp */
      };

extern struct ipc_ctbl ipc;    /* global ipc control table */

/* defines for ipc_ctbl cflags */
      #define FLG_IMAGE         0x0001    /* image copy in progress */
      #define FIFCLCK           0x0002    /* on-going fifo lock */
      #define FLG_DMA           0x0004    /* dma active */
      /*      e_structs.h       program    */

/*
       * defines for auxio signal codes
       */
      #define SIG_CCOC          0x0000
      #define ATNC_CONTINUE     0x0001    /* regain setatn? if FLG_IPC */
      #define SET_IFTOUT        0x0002    /* set infifo timeout */
      #define SET_OFTOUT        0x0004    /* set outfifo timeout */
      #define ATNC_PREMPT       0x0011    /* setatn? preempt request on SEQ_ERR */
```

```c
/*
 * defines for independent flags  (dcb.i_mflgs)
 */ define FLG_IPD  0x2000        /* Interrupt pending */
define FLG_IFQ  0x1000        /* on INFIFO queue */
#define FLG_CFQ  0x0800        /* on OUTFIFO queue */
define FLG_ATQ  0x0400        /* on setatn  queue */ define STAT_CH          0x3333  /* change status request for SetStatus() */

/*
 * FIFO request block
 */
struct frb {
        struct exec_dcb *fnxt_frb;      /* fwd chain ptr */
        struct exec_dcb *fdcb;          /* current owner */
};

/*
 * FIFO wait queue head
 */
struct fifo_q {
        struct exec_dcb *fq_t;   /* queue top */
        struct exec_dcb *fq_b;   /* queue bottom */
        long    fq_toutid;       /* timeout id */
};
        /*      e_structs.h     (cont)     */

/*
 * status int. request block
 */
struct srb {
        struct srb *srb_nxt;            /* fwd pointer in srb chain */
        struct exec_dcb *srb_dcb;       /* ptr to dcb */
        unsigned short  srb_stat;       /* aux status */
        unsigned                : 0;
        unsigned                : 29;   /* filler */
        unsigned        srb_done: 1;    /* command processing done flag */
        unsigned        srb_ipd : 1;    /* interrupt pending for request */
        unsigned        srb_lck : 1;    /* srb lock bit */
};

struct scsiptrs {       /* scsi saved pointers */
        struct cdb      *cmdptr;        /* command byte pointer */
        char            *dataptr;       /* data byte pointer (#blks if dma) */
        char            *statptr;       /* returned status byte */
};

/* interrupt register bitfields */ union intbits {
        struct {
                unsigned        : 0;    /* force f.w. alignment */
                unsigned        : 8;    /* filler */
                unsigned        : 1;    /* unused */
                unsigned ic     : 1;    /* invalid command */
                unsigned t      : 1;    /* used for testability */
                unsigned resel  : 1;    /* reselect */
                unsigned sel    : 1;    /* selection */
                unsigned dis    : 1;    /* disconnect */
                unsigned bs     : 1;    /* bus service */
                unsigned fc     : 1;    /* function complete */
        } ib;
        unsigned short  ibs;    /* equivalent h.w. tag */
};

/* auxiliary status bitfields */
```

```c
union statbits {
        struct {
                unsigned        : 0;    /* filler */
                unsigned        : 8;    /* filler */
                unsigned drf    : 1;    /* data register full */
                unsigned pe     : 1;    /* parity error detect */
                unsigned phase  : 3;    /* msg c/d i/o */
                unsigned pa     : 1;    /* paused */
                unsigned tcz    : 1;    /* transfer counter zero */
                unsigned        : 1;    /* not used */
        } st;
        unsigned short  sbs;    /* equivalent h.w. tab */
};
    /*      e_structs.h     (cont)      */

/* SCSI access control block */ struct sacb{
        struct fifo_q   s_f;            /* scsi wait queue root */
        struct rcb      s_r;            /* current rcb */
        int             (*s_dmap)();    /* ptr to dma ssr */
        int             (*s_scsip)();   /* ptr to scsi ssr */
/* define offset for interrupt.s */
#define S_DMAP  0x1a
#define S_SCSIP 0x1e
        unsigned short  s_ncmd;         /* next chip command */
        unsigned short  s_msgout;       /* working scsi message save */
        unsigned short  s_msgin;        /* working scsi message save */
        struct scsiptrs s_wptrs;        /* working pointers */
        unsigned short  s_phase;        /* current bus phase */
        union intbits   s_intr;         /* chip interrupt reg. save */
        union statbits  s_auxstat;      /* chip aux. reg. save */
};

/*
 *  Device dcb (executive definition)
 */
struct   exec_dcb {
        struct ind_dcb          ex;     /* driver independent part */
        union {
            struct disk_dcb     ex_d;
            struct mag_dcb      ex_t;
        }                       ex_dep;         /* driver dependent part */
                                        /* starts executive private part */
        struct srb      ex_srb[2];      /* status request blocks */
        struct srb      *ex_srbcur;     /* current srb */
        struct sacb     ex_sacb;        /* copy scsi_cb on disconnect */
        struct frb      ex_frb;         /* FIFO request control block */
        struct scsiptrs ex_sptrs;       /* scsi pointer save area */
};

extern unsigned short   ififo_lck,ofifo_lck;
    /*      scsihpro.h      program     */
/* signals */
/*
#define PMUX_DMA        1
#define SCSI_DMA        2
#define SCSI            3
 */
#define MSG_CAN         8
#define CMD_CAN         9
#define DMA_TCUT        4
#define IMG_SWITCH      0xC96   /* image switch device flag */

/* Auxiliary Status Register bits */ define AS_NU   1       /* bit not used */
define AS_TC   2       /* transfer counter zero */
```

```
#define AS_PA         4         /* chip paused */
#define AS_IO         8         /* I/O bus signal */
#define AS_CD         16        /* C/D bus signal */
#define AS_MSG        32        /* MSG bus signal */
#define AS_PAR        64        /* parity error */
#define AS_DRF        128       /* data register full */

/* scsi auxilliary status masks */
#define PAUSE         0x004     /* pause */
#define PE            0x040     /* parity error */
#define DRF           0x080     /* data register full */
#define DTA_OUT       0x00
#define CMD           0x02
#define MSG_OUT       0x06
#define DTA_IN        0x01
#define STAT          0x03
#define MSG_IN        0x07

/* scsi bus phase masks */ define DTAO_PHASE    0         /* data out */
define DTAI_PHASE    1         /* data in */
#define CMD_PHASE     2         /* command */
#define STAT_PHASE    3         /* status */
#define MSGO_PHASE    6         /* message out */
#define MSGI_PHASE    7         /* message in */

/* software phase masks */ define SEL_PHASE     8         /* selection phase */
define CON_PHASE     9         /* connected as initiator */
#define RSEL_PHASE    10        /* reselection phase */
#define TRM_PHASE     11        /* termination phase */
#define DIS_PHASE     12        /* disconnection phase */

/* scsi_cb.s_r.rcb_flgs defines */ define DMA_ACTIVE        1     /* dma engines active */
define SCSICB_CONNECT    2     /* curs scsi_cb */
#define DMA_REQ           4     /* dma requested */
#define RSEL_PND          8     /* l.r.n. active, reselect pending */
#define SFLG_HLT          16    /* halt request received */
#define SFLG_ABRT         32    /* request abort flag */

/*      scsihpro.h      (cont)        */

/* scsihpro local signal defines */ define SCSI_CONTINUE     10    /* continuation signal */

/* SCSI Interrupt Register defines */ define FNCT_COMPLETE     1     /* function complete */
define BUS_SERVICE       2     /* bus service */
#define DISCONNECT        4     /* disconnect */
#define SELECT            8     /* selected */
#define RESELECT          16    /* reselected */
#define TEST              32    /* used for testability */
#define INVALID_CMD       64    /* invalid command */
#define NULL_ASN          128   /* bit not used */

/* scsi command defines */
#define CHP_RESET         0x00
#define UNCONNECT         0x01
#define PAUSED            0x02
#define SET_ATN           0x03
#define MSG_ACCEPTED      0x04
#define CHP_DISABLE       0x05
#define SELECT_ATN        0x08
#define SELECT_NATN       0x09
```

```
#define TRANS_INFO        0x014
#define TRANS_PAD         0x015
#define DMA_MODE          0x08;
#define SINGLE            0x040

/* chip control register defines */
#define RESEL_ENABLE      0x002
#define PAR_ENABLE        0x004

/* scsi message defines */
#define CMD_CMPP          0x000
#define XT_MSG            0x001
#define SAVE_DPTRS        0x002
#define RSTR_PTRS         0x003
#define DISCNCT           0x004
#define INIT_DET_ERR      0x005
#define ABORT             0x006
#define MSG_REJECT        0x007
#define NO_OP             0x008
#define MSG_PAR_ERR       0x009
/*      MSG_RESET         0x00c */
#define IDENTIFY          0x0c0

/* scsi bus timeout values */
#define DEVICE_SELECTION_DELAY 1000   /* wait timeout on selection */

/* scsihpro.c macro definitions */
#define SUB      s_r.rct_sub
define SUBA     s_r.rct_suba define SLVL     s_r.rct_slvl
define FLGS     s_r.rct_flgs
        /*    scsihpro.h    (cont)    */ define DCE      s_f.fq_t define PARITY_ERR        13        /* general bus parity error occurred */

/* command group codes */
#define GRP0     0x00     /* group 0 -- 6 bytes */
#define GRP1     0x01     /* group 1 -- 10 bytes */

/* dma access control structs */
struct dma_acb {
        struct dma_acb  *d_fptr;        /* forward pointer */
        unsigned short  d_sad,d_ead;    /* dma ram buffer addresses */
        long            d_blkno;        /* block number */
        unsigned char   d_flgs;         /* acb control flags */
};

struct dma_h {
        struct dma_acb  *dh_tcp,*dh_bct;   /* queue top & bot pointers */
        long            dh_nblks;          /* total blocks to xfer */
        long            dh_cblks;          /* number of blocks xfered */
        long            dh_toutid;         /* timeout id */
        unsigned short  dh_partl;          /* partial block byte count */
        unsigned char   dh_flg;            /* control flags */
};

/*
 *  dma_h.dh_flg defines
 */
#define DMA_PIK_HOLE      0x001

/*
 *  dma_acb.f_flgs defines
 */
#define DMA_LAST          0x01    /* last acb in chain */
#define DMA_DONE          0x02    /* dma processing completed */
```

```
/*
 * dma error codes (dcb.i_errcode)
 */
#define DMA_PARITY_ERR   ERR_DTA
define DMA_TIMEOUT      ERR_DMATOUT /*
 * defines for dcb.i_flgs
 */
define FLG_SAC  0x0008000       /* scsi bus active */ define DRAM_STRT  0x3000        /* dma ram start address */ typedef unsigned short  DIRECTION;
        /*    scsihpro.h    (cont)    */ extern struct exec_dcb  *bus_busy[];    /* active l.u.n.'s expected
                                           to do reselection */
extern struct sacb       scsi_cb;

/* dma access control structures */
extern struct dma_h      dma_free,dma_out,dma_in;

extern unsigned short    input_dma;     /* which dma for input? */ extern PROCESS_ID        scsih_pid;

extern struct exec_dcb   *aux_tbl[];
```

The foregoing description has been made with particular emphasis on the preferred embodiment as illustrated in the drawings. Those of skill in the art will readily recognize, however, that numerous changes may be made to the embodiment illustrated and described above without departing from the spirit and scope of the present invention as defined by the following claims.

What is claimed is:

1. A peripheral controller for coupling devices coupled to a first data bus having a unique bus protocol and data transfer signals to devices coupled to a second data bus having a different protocol and data transfer rate, the controller comprising, in combination:

a system clock producing interleaved clock signals for a first state and for a second state;

a dual access buffer including a plurality of locations in a plurality of pages to access a location in a first page during said first state and to access a location in a second page during said second state;

first address defining means for providing a signal indicating a location in said first page;

second address defining means for providing a signal indicating a location in said second page;

first data coupling means, responsive to said clock signals and to said first page indicating signal, for coupling and transferring data between said first data bus and said buffer at said location in said first page during said first state;

an intermediate register comprising separate portions coupled to said buffer, all portions taken together having the same number of data bits as each accessible location in said buffer;

means, responsive to said clock signals and to said second page indicating signal, for coupling said intermediate register to said buffer at said location in said second page to transfer data from said intermediate register to said buffer during said second state;

second data coupling means for coupling said intermediate register to said second data bus to transfer data between separate portions of said intermediate register and said second data bus, said second data coupling means for gating data between all portions of said intermediate register and said second data bus.

2. A peripheral controller for coupling devices coupled to a first data bus having a unique bus protocol to devices coupled to a second data bus having a different data transfer rate and a second different protocol, the controller comprising, in combination:

a clock for generating first pulses interleaved with second pulses;

a dual access buffer with a data input and a data output and including a plurality of locations arranged in a plurality of pages each said location serving to store the same or greater number of data bits as are transmitted over either said first bus or said second bus;

a first address defining circuit for defining a first address to be used in connection with data transfers between locations within a first page in said buffer and said first data bus;

first control circuit means, responsive to said first pulses, said first address, and data transfer signals on said first data bus, for initiating a data transfer between said first data bus and said dual access buffer at the first address in synchronism with said first pulses and with said data transfer signals on said first data bus, said first control circuit means causing said first address defining circuit to increment the address contained therein after each data transfer between said buffer and said first data bus;

a first intermediate register comprising separate portions disposed between the data input to said buffer and said second data bus, all portions taken together having at least the same number of data bits as each location in said buffer;

a second intermediate register comprising separate portions disposed between the data output from said buffer and said second data bus, all portions taken together having at least the same number of data bits as each location in said buffer;

a second address defining circuit for defining a second address to be used in connection with data transfers between locations in a second page in said buffer and said second data bus;

second control circuit means, responsive to said second pulses and said second address:

(a) for coupling said second data bus to said portions of the first intermediate register to transfer data, and for transmitting the content of said first intermediate register to the addressed location of said buffer specified by said second address when said first intermediate register is filled and in synchronism with said second pulses, and (b) for coupling said buffer to said second intermediate register to fill data in a least portion of said second intermediate register, said data coming from the addressed location of said buffer specified by said second address and for transmitting data in at least two portions in said second intermediate register to said second data bus.

3. The controller of claim 2 additionally including a microprocessor coupled to said first and said second control circuit, said first and said second control circuit producing an interrupt signal to said microprocessor when the last location in the page specified by either said control circuit is accessed, said microprocessor responding to said interrupt from said first control circuit by placing a new address in said first address defining circuit, said microprocessor responding to said interrupt from said second control circuit by placing a new address in said second address defining circuit.

* * * * *